(12) United States Patent
Sato et al.

(10) Patent No.: US 12,063,000 B2
(45) Date of Patent: Aug. 13, 2024

(54) ELECTRIC POWER CONVERSION WITH PHASE CORRECTION

(71) Applicant: KABUSHIKI KAISHA YASKAWA DENKI, Kitakyushu (JP)

(72) Inventors: Sadayuki Sato, Fukuoka (JP); Hideaki Iura, Fukuoka (JP); Akira Yamazaki, Fukuoka (JP)

(*) Notice: Subject to any disclaimer, the term of this patent is extended or adjusted under 35 U.S.C. 154(b) by 225 days.

(21) Appl. No.: 17/731,302

(22) Filed: Apr. 28, 2022

(65) Prior Publication Data
US 2022/0255481 A1    Aug. 11, 2022

Related U.S. Application Data

(63) Continuation of application No. PCT/JP2020/018339, filed on Apr. 30, 2020.

(30) Foreign Application Priority Data

Nov. 5, 2019 (JP) .................................. 2019-200634

(51) Int. Cl.
*H02P 21/14* (2016.01)
*H02P 6/185* (2016.01)
*H02P 21/13* (2006.01)

(52) U.S. Cl.
CPC .............. *H02P 21/14* (2013.01); *H02P 6/185* (2013.01); *H02P 21/13* (2013.01)

(58) Field of Classification Search
CPC ........... H02P 21/14; H02P 6/185; H02P 21/13
See application file for complete search history.

(56) References Cited

U.S. PATENT DOCUMENTS 6,625,519 B2 * 9/2003 Goodwin ............ F04D 15/0236
700/282
7,075,266 B2 * 7/2006 Tobari ...................... H02P 21/06
318/434
(Continued)

FOREIGN PATENT DOCUMENTS

EP     1133050      9/2001
JP     4228651      2/2009
(Continued)

OTHER PUBLICATIONS

International Search Report dated Aug. 4, 2020 for PCT/JP2020/018339.

(Continued)

*Primary Examiner* — Rina I Duda
(74) *Attorney, Agent, or Firm* — SOEI PATENT & LAW FIRM

(57) ABSTRACT

A power conversion device include: a power conversion circuitry configured to generate a driving voltage for an electric motor; and control circuitry configured to: control the power conversion circuitry to generate the driving voltage corresponding to a voltage command; acquire information indicating an output current that has flown to the electric motor according to the driving voltage; calculate a phase error based on the voltage command, the output current, and an inductance of the electric motor; calculate an updated voltage command based on a frequency command, the output current, and the inductance, wherein the updated voltage command has a command phase; calculate a phase error based on the voltage command, the output current, and the inductance; correct the command phase based on the phase error; and control the power conversion circuitry to generate the driving voltage corresponding to the updated voltage command having the corrected command phase.

20 Claims, 11 Drawing Sheets

(56) References Cited

U.S. PATENT DOCUMENTS

| | | | |
|---|---|---|---|
| 8,327,670 B2 * | 12/2012 | Maekawa | D06F 37/304 68/12.02 |
| 8,988,027 B2 * | 3/2015 | Fukumaru | H02P 21/20 318/715 |
| 2006/0012351 A1 * | 1/2006 | Moussaoui | H02M 3/1584 323/271 |
| 2007/0046249 A1 | 3/2007 | Tomigashi et al. | |
| 2012/0306415 A1 * | 12/2012 | Kawakami | H02M 3/158 318/400.23 |
| 2013/0049661 A1 | 2/2013 | Cao et al. | |
| 2013/0265013 A1 | 10/2013 | Cao et al. | |
| 2016/0190970 A1 * | 6/2016 | Yamazaki | H02P 27/08 318/400.29 |
| 2016/0276970 A1 | 9/2016 | Hawes et al. | |
| 2018/0375456 A1 | 12/2018 | Huh et al. | |
| 2019/0190414 A1 | 6/2019 | Devos et al. | |
| 2020/0255067 A1 | 8/2020 | Tanaka et al. | |

FOREIGN PATENT DOCUMENTS

| | | |
|---|---|---|
| JP | 2009-291072 | 12/2009 |
| JP | 2010-088238 | 4/2010 |
| JP | 2012-228100 | 11/2012 |
| WO | 2019/092777 | 5/2019 |
| WO | 2019/149675 | 8/2019 |

OTHER PUBLICATIONS

Office Action issued in Japanese Patent Application No. P2021-554810, dated Apr. 4, 2023 (with English partial translation).

International Preliminary Report on Patentability with Written Opinion dated May 19, 2022 for PCT/JP2020/018339.

Extended Search Report in corresponding European Application No. 20885581.7, dated Sep. 29, 2023.

* cited by examiner

ELECTRIC POWER CONVERSION WITH PHASE CORRECTION

CROSS-REFERENCE TO RELATED APPLICATIONS

This application is a continuation application of PCT Application No. PCT/JP2020/018339 filed on Apr. 30, 2020, which claims the benefit of priority from Japanese Patent Application No. 2019-200634, filed on Nov. 5, 2019, the entire contents of which are incorporated herein by reference.

BACKGROUND

Field

The present disclosure relates to a power conversion device, a power conversion method, and a system.

Description of the Related Art

Japanese Patent No. 4228651 discloses a control method for controlling an armature rotating magnetic field and a rotor speed of an IPM motor by using an estimated signal of a rotor magnetic pole position and a rotor speed estimated signal obtained by calculation from an internal signal of a control device of the IPM motor.

SUMMARY

Disclosed herein is an example power conversion device. The power conversion device according to an aspect of the disclosure may include: a power conversion circuitry configured to generate a driving voltage for an electric motor; and control circuitry configured to: control the power conversion circuitry to generate the driving voltage corresponding to a voltage command; acquire information indicating an output current that has flowed to the electric motor according to the driving voltage; calculate a phase error based on the voltage command, the output current, and an inductance of the electric motor; calculate an updated voltage command based on a frequency command, the output current, and an inductance of the electric motor, wherein the updated voltage command has a command phase; correct the command phase based on the phase error; and control the power conversion circuitry to generate the driving voltage corresponding to the updated voltage command having the corrected command phase.

Additionally, an example power conversion method is disclosed herein. The power conversion method may include: controlling a power conversion circuitry to generate a driving voltage corresponding to a voltage command having; acquiring current information indicating an output current that has flowed, according to a driving voltage, from a power conversion circuitry to an electric motor; calculating a phase error based on the voltage command, the output current, and an inductance of the electric motor; calculating an updated voltage command based on a frequency command, the output current, and the inductance, wherein the updated voltage command has a command phase; correcting the command phase based on the phase error; and controlling the power conversion circuitry to generate the driving voltage corresponding to the updated voltage command having the corrected command phase to drive the electric motor.

Additionally, an example non-transitory memory device is disclosed herein. The non-transitory memory device may have instructions stored thereon that, in response to execution by a processing device, cause the processing device to perform operations comprising: controlling a power conversion circuitry to generate a driving voltage corresponding to a voltage command; acquiring current information indicating an output current that has flowed, according to a driving voltage, from a power conversion circuitry to an electric motor; calculating a phase error based on the voltage command, the output current, and an inductance of the electric motor; calculating an updated voltage command based on a frequency command, the output current, and the inductance, wherein the updated voltage command has a command phase; correcting the command phase based on the phase error; and controlling the power conversion circuitry to generate the driving voltage corresponding to the updated voltage command having the corrected command phase to drive the electric motor.

DETAILED DESCRIPTION

Figure 1:
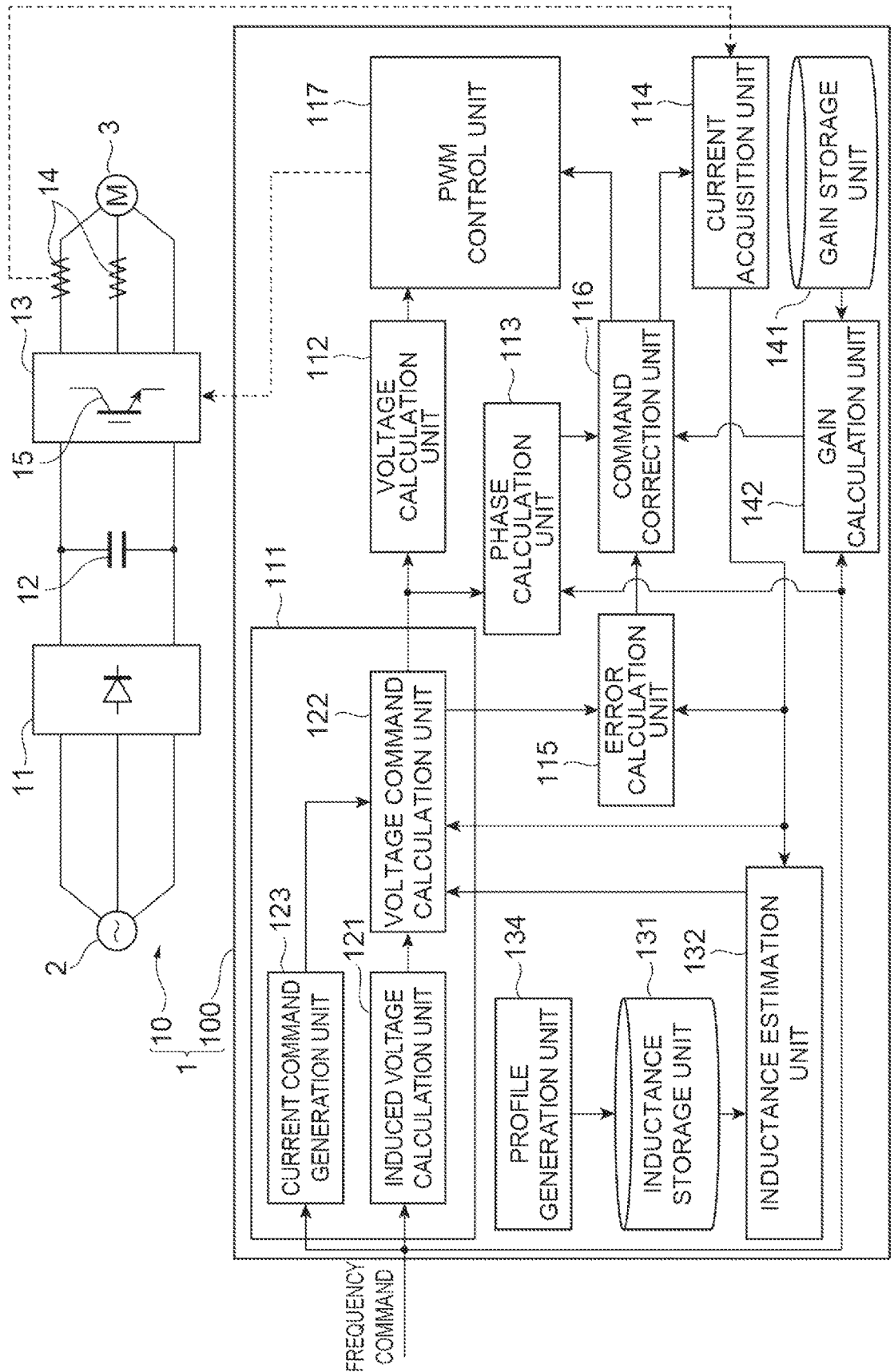
FIG. 1 is a block diagram illustrating an example configuration of a power conversion device.

A power conversion device 1 illustrated in FIG. 1 is a device that performs power conversion between a power supply 2 and an electric motor 3. The power supply 2 is, for example, a three-phase alternating-current (AC) power supply. Examples of the power supply 2 include a three-phase AC power system, a three-phase AC generator, and an uninterruptible power supply.

The electric motor 3 is a synchronous motor that operates by supply of AC power (for example, three-phase AC power). The electric motor 3 may be a synchronous motor having saliency. Having saliency means that an inductance of the electric motor 3 in the magnetic pole direction of a movable element is different from an inductance of the electric motor 3 in a direction perpendicular to the magnetic pole direction. Examples of the synchronous motor having saliency include a permanent magnet assistance (PMA) motor, an interior permanent magnet (IPM) motor, and a synchronous reluctance motor. The electric motor 3 may be a synchronous motor having no saliency. Examples of the synchronous motor having no saliency include a surface permanent magnet (SPM) motor.

The electric motor 3 may be a fixed coil type in which a coil is provided in a fixed element or may be a movable coil type in which a coil is provided in a movable element. The electric motor 3 may be a rotary type or a linear type. Hereinafter, a case where the electric motor 3 is a rotary type will be described, and the operation speed of the electric motor 3 will be referred to as "rotational speed". "Rotational speed" is the rotational speed of the electric motor 3.

The power conversion device 1 includes power conversion circuitry 10 and control circuitry 100. The power conversion circuitry 10 (a power conversion unit) performs power conversion between the power supply 2 and the electric motor 3 to generate AC power for driving the electric motor 3. For example, the power conversion circuitry 10 converts AC power from the power supply 2 (hereinafter referred to as "source power") into AC power for driving the electric motor 3 (hereinafter referred to as "driving power"), and supplies the converted AC power to the electric motor 3. As an example, the power conversion circuitry 10 includes rectifier circuitry 11, a smoothing capacitor 12, inverter circuitry 13, and a current sensor 14. The rectifier circuitry 11 is, for example, diode bridge circuitry or PWM converter circuitry, and converts the source power into direct-current (DC) power. The smoothing capacitor 12 smoothes the DC power.

The inverter circuitry 13 performs power conversion between the DC power and the driving power. For example, the inverter circuitry 13 converts DC power into driving power and supplies the driving power to the electric motor 3 in a power running state, and converts electric power generated by the electric motor 3 into DC power in a regeneration state. The power running state is a state in which the electric motor 3 is operated by driving power supplied from the inverter circuitry 13, and the regeneration state is a state in which the electric motor 3 supplies generated power corresponding to the motion to the inverter circuitry 13.

For example, the inverter circuitry 13 includes a plurality of switching elements 15, and performs the power conversion by turning on and off the switching elements 15. The switching elements 15 are, for example, a power metal oxide semiconductor field effect transistors (MOSFET), insulated gate bipolar transistors (IGBT), or the like, and turn on and off in accordance with a gate drive signal.

The current sensor 14 detects a current flowing between the inverter circuitry 13 and the electric motor 3. For example, the current sensor 14 may be configured to detect currents of all phases (U-phase, V-phase, and W-phase) of the three-phase alternating current, or may be configured to detect currents of any two phases of the three-phase alternating current. Since the sum of the currents of the U-phase, the V-phase, and the W-phase is zero as long as the zero-phase current is not generated, the information of the currents of all the phases is obtained even when the currents of two phases are detected.

The configuration of the power conversion circuitry 10 described above is merely an example. The configuration of the power conversion circuitry 10 may be modified in any manner as long as the driving power of the electric motor 3 can be generated. For example, the rectifier circuitry 11 may be thyristor converter circuitry or matrix converter circuitry that converts AC power to DC power. The power conversion circuitry 10 may be matrix converter circuitry that performs bi-directional power conversion between source power and driving power without going through DC conversion. When the source power is DC power, the power conversion circuitry 10 may not include the rectifier circuitry 11.

The control circuitry 100 is configured to execute: calculating a voltage command based on a frequency command, an output current from the power conversion circuitry 10 to the electric motor 3, and an estimated value of an inductance of the electric motor 3; calculating a phase error based on the voltage command, the output current from the power conversion circuitry 10 to the electric motor 3, and the estimated value the inductance; correcting a phase of the voltage command (a command phase) based on the phase error; and controlling the power conversion circuitry 10 to control the driving power to follow the voltage command having the corrected phase.

For example, the control circuitry 100 includes a command generation unit 111, a voltage calculation unit 112, a phase calculation unit 113, a current acquisition unit 114, an error calculation unit 115, a command correction unit 116, and a PWM control unit 117 as functional configurations (hereinafter referred to as a "functional block"). Since each functional block is a component of the control circuitry 100, the processing executed by each functional block corresponds to the processing executed by the control circuitry 100.

The command generation unit 111 is configured to calculate the voltage command based on the frequency command, the output current from the power conversion circuitry 10 to the electric motor 3, and the estimated value of the inductance of the electric motor 3. The frequency command is a command for determining a target value of a frequency of the driving power (a frequency for driving the electric motor 3). The frequency command may be the target value itself of the frequency of the driving power (the frequency of the driving voltage), or may be a numerical value indirectly determining the target value. For example, the frequency command may be a target value of a rotational speed (a synchronization speed) of the electric motor 3. The estimated value means a value that is not based on a real-time actual measurement result. The estimated value may be a design value that is not based on actual measurement, or may be a value calculated by simulation. The estimated value may be a value actually measured in advance. The voltage command is, for example, a target value of a voltage output from the power conversion circuitry 10 to the electric motor 3.

For example, the command generation unit 111 includes an induced voltage calculation unit 121 and a voltage command calculation unit 122 as more subdivided functional blocks. The induced voltage calculation unit 121 is configured to calculate an induced voltage corresponding to the frequency command (hereinafter referred to as an "induced voltage target value") in accordance with a predetermined command profile. For example, the command profile is predetermined so that the induced voltage target value changes by a change amount directly proportional to a change amount of the frequency command. The command profile may be defined such that the induced voltage target value is constant when the frequency command is equal to or greater than a predetermined upper limit value.

The voltage command calculation unit 122 is configured to calculate a voltage command based on an equivalent circuit of the electric motor 3 using the induced voltage target value calculated by the induced voltage calculation unit 121. For example, the voltage command calculation unit 122 calculates a voltage command vector in a coordinate system rotating in synchronization with the frequency command (hereinafter referred to as a "rotating coordinate system"). The rotating coordinate system rotates with respect to a coordinate system fixed to the fixed element (a stator) of the electric motor 3 (hereinafter referred to as a "fixed coordinate system").

An example of the fixed coordinate system is an αβ-coordinate system. The origin of the αβ-coordinate system is located on the rotational axis of the movable element of the electric motor 3. The α-axis is a coordinate axis whose direction coincides with the direction of a magnetomotive force generated by a current flowing in any of the three-phase winding of the fixed element, for example. The β-axis is a coordinate axis perpendicular to the α-axis and the rotation center axis of the movable element of the electric motor 3.

Figure 2:
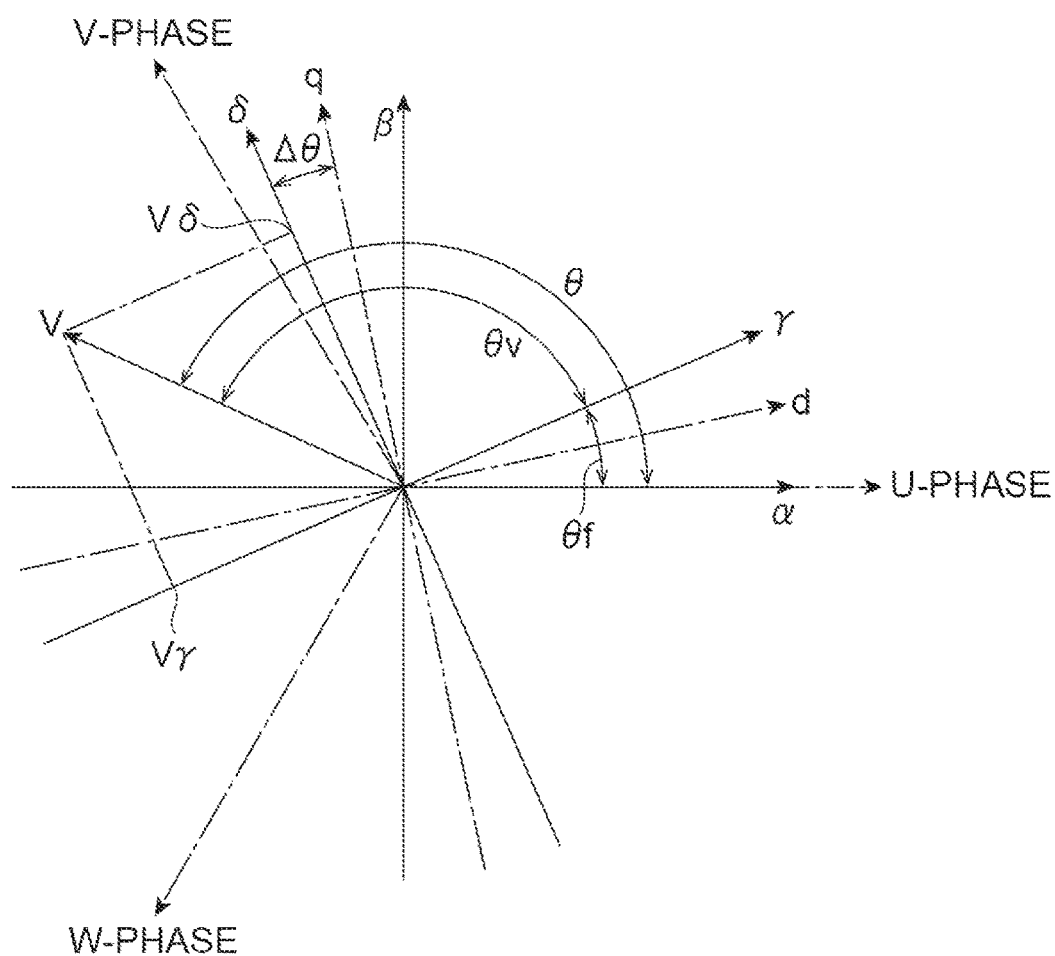
FIG. 2 is a schematic diagram illustrating an example fixed coordinate system and an example rotating coordinate system.

Examples of the rotating coordinate system includes a γδ-coordinate system illustrated in FIG. 2. The origin of the γδ-coordinate system is located on the rotational axis of the movable element of the electric motor 3. The γδ-coordinate system is a coordinate system that rotates in synchronization with the frequency of the output voltage. The γ-axis coincides with the α-axis of the αβ-coordinate system, which is a fixed coordinate system described former, at the time of startup, for example, and rotates in synchronization with the frequency command in response to startup. The δ-axis is a coordinate axis perpendicular to the γ-axis and the rotation center axis of the movable element of the electric motor 3. Various quantities related to control are calculated based on the γδ-coordinate system.

On the other hand, there is a dq-coordinate system which rotates with being fixed to the movable element (a rotor) of the electric motor 3. The origin of the dq-coordinate system is located on the rotational axis of the movable element of the electric motor 3. The d-axis is a coordinate axis in which the magnetic pole direction of the movable element of the electric motor 3 (the direction from the S-pole to the N-pole in a permanent magnet) is the positive direction. The q-axis is a coordinate system perpendicular to the d-axis and the rotation center axis of the movable element of the electric motor 3.

For example, the voltage command calculation unit 122 calculates a γ-axis voltage command Vγ which is a γ-axis component of the voltage command vector V, and a δ-axis voltage command Vδ which is a δ-axis component of the voltage command vector V. The voltage command calculation unit 122 calculates the γ-axis voltage command Vγ and the δ-axis voltage command Vδ by applying a compensation of a winding voltage drop based on the output current from the power conversion circuitry 10 to the electric motor 3 and the winding resistance of the electric motor 3, and a decoupling compensation based on the rotational speed of the electric motor 3 and the estimated value of the inductance of the electric motor 3 to the induced voltage target value.

As an example, the voltage command calculation unit 122 calculates the γ-axis voltage command Vγ and the δ-axis voltage command Vδ by the following expressions.

$$V\gamma = R \cdot i\gamma - \omega \cdot L\delta \cdot i\delta \quad (1)$$

$$V\delta = \omega \cdot L\gamma \cdot i\gamma + R \cdot i\delta + E \quad (2)$$

In expressions (1) and (2), iγ is a γ-axis component of an output current vector (hereinafter referred to as a "γ-axis current"). iδ is a δ-axis component of the output current vector (hereinafter referred to as a "δ-axis current"). R is a winding resistance of the electric motor 3. ω is a rotational speed of the movable element and is derived based on the frequency command. Lγ is an inductance of the electric motor 3 with respect to the γ-axis current (hereinafter referred to as "γ-axis inductance"). Lδ is an inductance of the electric motor 3 with respect to the δ-axis current (hereinafter referred to as "δ-axis inductance"). E is the induced voltage target value and is determined based on the frequency command using, for example, a V/f pattern that is set.

The voltage command calculation unit 122 uses a γ-axis current iγ and a δ-axis current iδ calculated by the current acquisition unit 114 described later as the γ-axis current iγ and the δ-axis current iδ for calculating the γ-axis voltage command Vγ and the δ-axis voltage command Vδ. The voltage command calculation unit 122 may use a value calculated by the current acquisition unit 114 as one of the γ-axis current iγ and the δ-axis current iδ for calculating the γ-axis voltage command Vγ and the δ-axis voltage command Vδ, and may use a predetermined command value as the other of the γ-axis current iγ and the δ-axis current iδ.

For example, the voltage command calculation unit 122 may use the value calculated by the current acquisition unit 114 as the δ-axis current iδ for calculating the γ-axis voltage command Vγ and the δ-axis voltage command Vδ and may use a predetermined command value as the γ-axis current iγ. In this case, the command generation unit 111 may further include a current command generation unit 123. The current command generation unit 123 is configured to generate a command value of the γ-axis current iγ. The current command generation unit 123 may generate a negative γ-axis current iγ as a command for a reluctance power (a power due to saliency). The current command generation unit 123 may generate the γ-axis current iγ based on the frequency command. For example, the current command generation unit 123 may increase the absolute value of the γ-axis current iγ as the frequency command increases. Increasing the absolute value of the γ-axis current iγ in accordance with an increase in the frequency command includes increasing the absolute values of the γ-axis current iγ in accordance with an increase in the frequency command in a predetermined range of the frequency command and making the absolute values of the γ-axis current iγ constant in other ranges.

Returning to FIG. 1, the voltage calculation unit 112 is configured to calculate the absolute value of the voltage command generated by the command generation unit 111. For example, the voltage calculation unit 112 calculates the square root of the sum of squares of the γ-axis voltage command Vγ and the δ-axis voltage command Vδ calculated by the voltage command calculation unit 122 as the absolute value of the voltage command vector V.

The phase calculation unit 113 is configured to calculate the phase of the voltage command (the command phase) in the fixed coordinate system. The command phase includes a rotation phase of a rotating coordinate system that rotates in accordance with an operation of the electric motor (for example, a rotation of the rotor), and a relative command phase of the voltage command that is relative to the rotating coordinate system. For example, the phase calculation unit 113 calculates the phase angle of the voltage command vector V with respect to the α-axis of the αβ-coordinate system. For example, the phase calculation unit 113 calculates the phase angle θf (the rotation phase) of the γδ-coordinate system with respect to the αβ-coordinate system (for example, a phase angle of the γ-axis with respect to the α-axis) based on the frequency command, calculates the phase angle θv (the relative command phase) of the voltage command vector V in the γδ-coordinate system (a phase angle of the voltage command vector V with respect to the γ-axis) based on the γ-axis voltage command Vγ and the δ-axis voltage command Vδ, and sums a phase angle θf and a phase angle θv to calculate a phase angle θ of the voltage command vector V with respect to the α-axis (see FIG. 2).

The current acquisition unit 114 is configured to acquire the current information from the current sensor 14. For example, the current acquisition unit 114 performs three-phase to two-phase conversion and rotational coordinate conversion on the current information acquired from the current sensor 14 to calculate the γ-axis current iγ and the δ-axis current iδ. This rotational coordinate conversion requires a phase of the rotating coordinate system with respect to the fixed coordinate system (hereinafter referred to as a "rotation phase"). For example, the current acquisition unit 114 uses the phase angle θf calculated by the phase calculation unit 113 for the rotational coordinate conversion.

The error calculation unit 115 is configured to calculate the phase error of the voltage command based on the voltage command, the output current from the power conversion circuitry 10 to the electric motor 3, and the estimated value of the inductance. The phase error is an angular error between the γδ-coordinate system and the dq-coordinate system.

For example, the error calculation unit 115 calculates an induced voltage vector based on the voltage command vector, the output current vector from the power conversion circuitry 10 to the electric motor 3, the winding resistance of the electric motor 3, and the estimated value of the inductance, and calculates the phase error based on the phase of the induced voltage vector. The induced voltage vector is generated in response to the operation of the electric motor. The error calculation unit 115 may calculate the phase error based on a relative phase of the induced voltage vector that is relative to the rotating coordinate system. For example, the error calculation unit 115 calculates a phase angle (the relative phase) of the induced voltage vector in the γδ-coordinate system with respect to the δ-axis as a phase error. As an example, the error calculation unit 115 calculates the phase error by the following expressions, assuming that the rotational direction of the γδ-coordinate system with respect to the αβ-coordinate system is a positive direction.

$$\Delta\theta = -\tan^{-1}(\varepsilon d / \varepsilon q) \quad (3)$$

$$\varepsilon d = V\gamma - R \cdot i\gamma + \omega \cdot L\delta \cdot i\delta \quad (4)$$

$$\varepsilon q = V\delta - \omega \cdot L\gamma \cdot i\gamma - R \cdot i\delta \quad (5)$$

In expressions (3), (4), and (5), Δθ is the phase error, εd is the γ-axis component of the induced voltage vector, and εq is the δ-axis component of the induced voltage vector.

As described in the examples above, the phase angle of the induced voltage vector with respect to the δ-axis in the γδ-coordinate system can be used as the phase error as follows. When the γ-axis coincides with the d-axis facing the positive direction of the magnetic pole direction of the movable element of the electric motor 3, the induced voltage is originally generated in the δ-axis direction and is not generated in the γ-axis direction. However, when the γ-axis does not coincide with the d-axis, the induced voltage vector is inclined with respect to the δ-axis by the error. Therefore, it can be said that the phase angle of the induced voltage vector with respect to the δ-axis indicates the phase error. The phase error is mainly generated by an error of the estimated value of the inductance. In particular, in a synchronous reluctance motor, since the fluctuation of the inductance in accordance with the value of the output current is large compared to a permanent magnet type electric motor, the error of the estimated value of the inductance is likely to be large.

The current acquisition unit 114 may use a phase angle obtained by adding a phase error Δθ to the phase angle θf calculated by the phase calculation unit 113 in the rotational coordinate conversion.

The command correction unit 116 is configured to correct the phase of the voltage command based on the phase error calculated by the error calculation unit 115. For example, the command correction unit 116 may correct the phase of the voltage command by adding a correction amount based on the phase error calculated by the error calculation unit 115 to the phase calculated by the phase calculation unit 113 (hereinafter referred to as a "phase before correction"). Hereinafter, the phase of the corrected voltage command is referred to as a "phase after correction". The command correction unit 116 may calculate the correction amount (hereinafter referred to as a "correction amount by proportional operation") by multiplying the phase error calculated by the error calculation unit 115 by a predetermined proportional gain.

The command correction unit 116 may correct the phase of the voltage command based on an integral value of the phase error. For example, the command correction unit 116 may calculate the correction amount based on an integral value of the phase error calculated by the error calculation unit 115. The command correction unit 116 may calculate the correction amount (hereinafter referred to as a "correction amount by integral operation") by multiplying the integral value of the phase error calculated by the error calculation unit 115 by a predetermined proportional gain. The command correction unit 116 may calculate the phase after correction by adding both of the correction amount by proportional operation and the correction amount by integral operation to the phase before correction.

The command correction unit 116 may calculate the phase after correction by adding, to the phase before correction, a correction amount obtained by applying low-pass filtering to the correction amount calculated as described above. The command correction unit 116 may perform low-pass filtering on the phase after correction to correct the phase of the voltage command.

The PWM control unit 117 (a control unit) is configured to control the power conversion circuitry 10 to control the driving power to follow the voltage command having the phase corrected by the command correction unit 116. Controlling the driving power to follow the voltage command means controlling the voltage in the driving power to follow the voltage command. For example, the PWM control unit 117 turns on and off of the switching elements 15 of the inverter circuitry 13 so as to output, to the electric motor 3, a voltage that matches a voltage command determined by the absolute value calculated by the voltage calculation unit 112 and the phase after correction calculated by the command correction unit 116.

The control circuitry 100 may be configured to change the estimated value of the inductance in response to a value of output current from the power conversion circuitry 10 to the electric motor 3. For example, the control circuitry 100 may further include an inductance storage unit 131 and an inductance estimation unit 132.

The inductance storage unit 131 stores the inductance profile. As described above, the inductance profile is a profile indicating the relationship between the value of the output current and the value of the inductance. The inductance profile is set such that the inductance changes in accordance with the value of the output current. The inductance profile is set such that at least the inductance corresponding to a first output current value and the inductance corresponding to a second output current value are different from each other.

The inductance storage unit 131 may individually store an inductance profile of a γ-axis inductance Lγ and an inductance profile of a δ-axis inductance Lδ. The inductance storage unit 131 may store an inductance profile that changes in accordance with the value of the γ-axis current iγ or the δ-axis current iδ for each of the γ-axis inductance Lγ and the δ-axis inductance Lδ.

Further, the inductance storage unit 131 may store a three-dimensional inductance profile that changes in accordance with two values of the γ-axis current iγ and the δ-axis current iδ for each of the γ-axis inductance Lγ and the δ-axis inductance Lδ. The inductance storage unit 131 may store the inductance profile as a function or may store the inductance profile as point sequence data.

The inductance estimation unit 132 is configured to derive the estimated value of inductance based on the value of output current acquired (calculated) by the current acquisition unit 114 (for example, the γ-axis current iγ and the δ-axis current iδ) and the inductance profile stored by the inductance storage unit 131. For example, the inductance estimation unit 132 derives the value of the inductance corresponding to the value of the output current in the inductance profile as the estimated value of the inductance. When the inductance profile is point sequence data, the inductance estimation unit 132 may derive the inductance value corresponding to the value of the output current by interpolation of the point sequence data.

When the control circuitry 100 includes the inductance storage unit 131 and the inductance estimation unit 132, the voltage command calculation unit 122 calculates the voltage command based on the estimated value of the inductance derived by the inductance estimation unit 132. The error calculation unit 115 calculates the phase error based on the estimated value of the inductance derived by the inductance estimation unit 132.

The control circuitry 100 may further include a profile generator 134. The profile generator 134 is configured to generate the inductance profile based on a user input specifying at least two points of the inductance profile, and to store the generated inductance profile in the inductance storage unit 131. Each of the at least two points includes a combination of a value of the output current and a value of the inductance profile. The user input is an input by a user of the power conversion device 1, and is input with, for example, an input device 300 described later. The profile generator 134 may store data in which the output current, the estimated value of the inductance, and the phase error are associated with each other while changing the estimated value of the inductance, and may automatically set the inductance profile so as to reduce the phase error based on the stored data.

The control circuitry 100 may be configured to reduce the correction of the phase of the voltage command by the error calculation unit 115 when the rotational speed of the electric motor 3 is a second speed that is higher than a first speed, compared to when the rotational speed of the second unit is the first speed. For example, the control circuitry 100 further includes a gain storage unit 141 and a gain calculation unit 142. The gain storage unit 141 stores a gain profile in which the gain during the operation of the electric motor 3 at the first speed is smaller than the gain during the operation of the electric motor 3 at the second speed that is higher than the first speed. The first speed and the second speed may be any speed as long as there is a relationship that the second speed is higher than the first speed.

Figure 3:
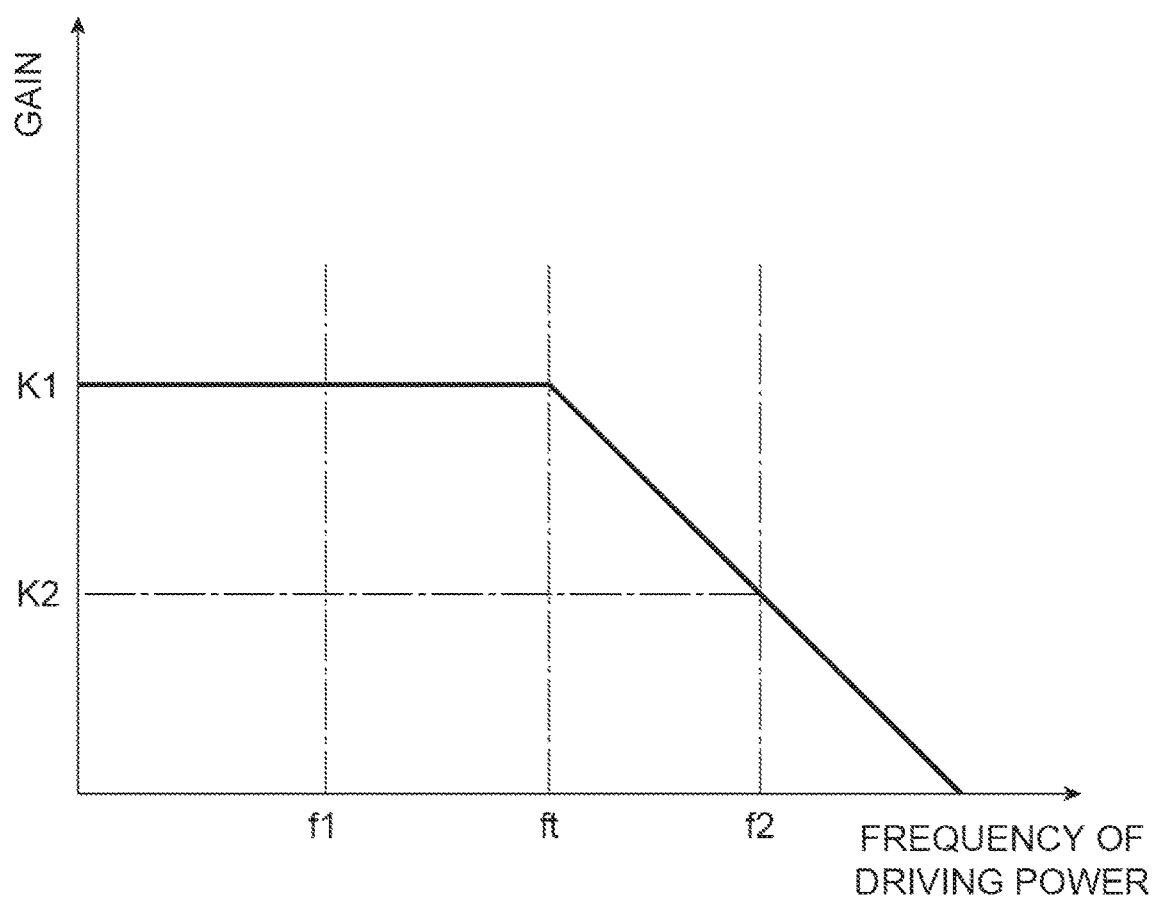
FIG. 3 is a graph illustrating an example gain profile.

FIG. 3 is a graph illustrating an example of the gain profile. In FIG. 3, the horizontal axis represents frequency of the driving power (the frequency of the driving voltage). Since the frequency of the driving power (the frequency of the driving voltage) is substantially proportional to the rotational speed of the electric motor 3, it can be said that the horizontal axis represents the rotational speed of the electric motor 3. The vertical axis represents the magnitude of gain. In the FIG. 3, the gain is constant when the frequency of the driving voltage is equal to or lower than a predetermined frequency threshold ft. Above the frequency threshold ft, the gain decreases as the frequency increases (i.e., As the rotational speed of the electric motor 3 increases).

In this profile, the gain when the frequency is higher than the frequency threshold ft (when the rotational speed of the electric motor 3 is the second speed) is smaller than the gain when the frequency is lower than the frequency threshold ft (when the rotational speed of the electric motor 3 is the first speed). For example, a gain K2 corresponding to a frequency f2 larger than the frequency threshold ft is smaller than a gain K1 corresponding to a frequency f1 smaller than the frequency threshold ft. The gain storage unit 141 may store the gain profile as a function or may store the gain profile as point sequence data.

The gain calculation unit 142 is configured to calculate the gain based on the rotational speed of the electric motor 3 and the gain profile. The gain calculation unit 142 may calculate the gain based on the frequency command and the gain profile. Since the rotational speed of the electric motor 3 is substantially proportional to the frequency command, being based on the frequency command corresponds to being based on the rotational speed of the electric motor 3. For example, the gain calculation unit 142 calculates a gain corresponding to the frequency command in the gain profile. When the gain profile is point sequence data, the gain calculation unit 142 may calculate the gain corresponding to the frequency command by interpolation of the point sequence data.

When the control circuitry 100 includes the gain storage unit 141 and the gain calculation unit 142, the command correction unit 116 may correct the phase of the voltage command by a correction amount obtained by multiplying the gain calculated by the gain calculation unit 142 by a correction amount based on the phase error. The control circuitry 100 may further include a gain generation unit (not illustrated) that is configured to generate a gain profile based on a user input or the like and to store the generated gain profile in the gain storage unit 141. The gain generation unit may be configured to automatically generate a gain profile based on the accumulated data.

Figure 4:
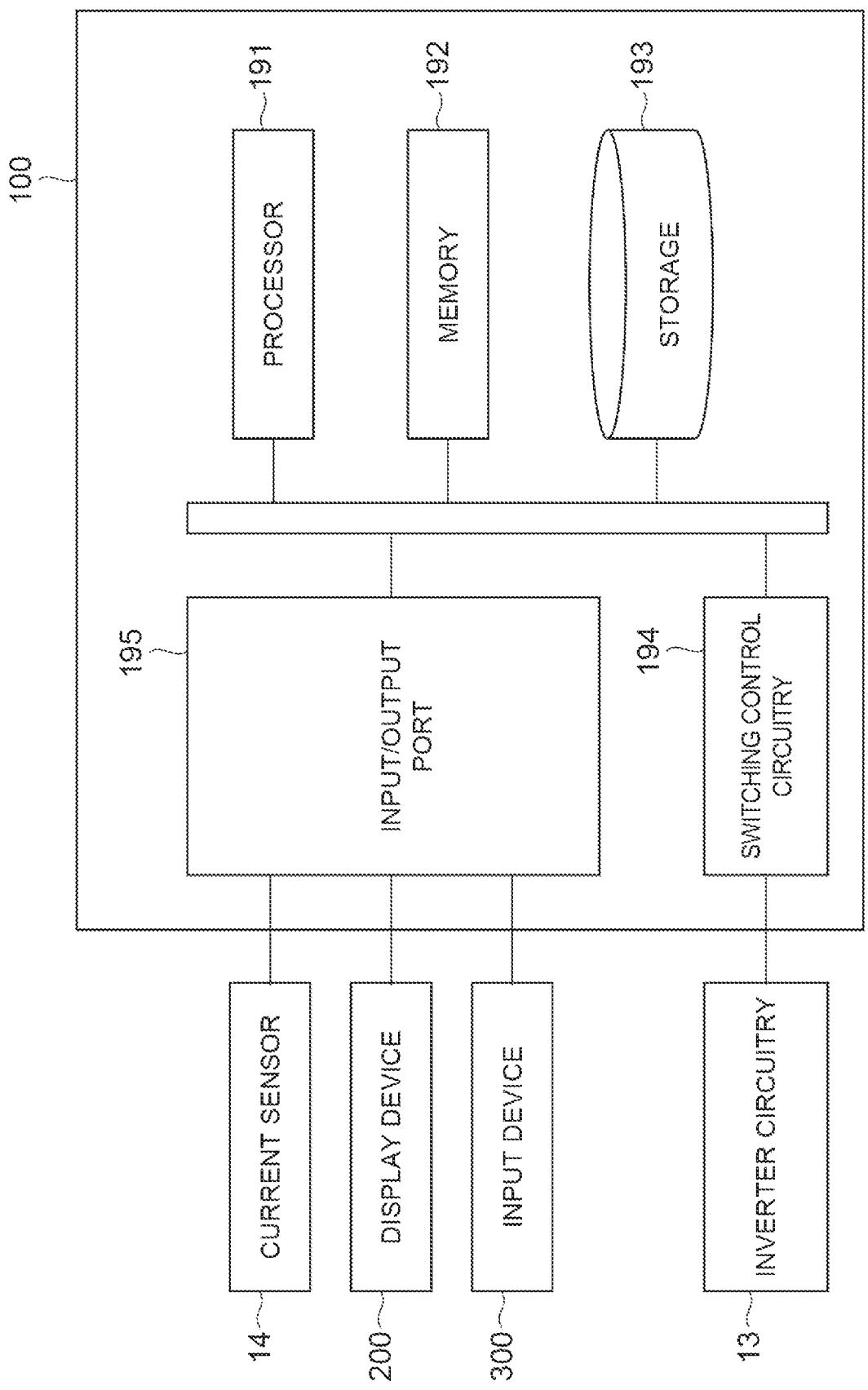
FIG. 4 is a block diagram illustrating an example hardware configuration of a control circuitry.

FIG. 4 is a block diagram illustrating a hardware configuration of the control circuitry 100. As illustrated in FIG. 4, the control circuitry 100 includes at least one a processor 191, a memory 192, storage 193, and switching control circuitry 194. The storage 193 includes a computer-readable storage medium, such as a hard disk. The storage medium may be a removable medium such as a nonvolatile semiconductor memory, a magnetic disk, or an optical disk. The storage 193 stores a program for controlling the control circuitry 100 to execute: calculating the voltage command based on the frequency command, the output current from the power conversion circuitry 10 to the electric motor 3, and the estimated value of inductance of the electric motor 3; calculating the phase error based on the voltage command, the output current, and the estimated value of inductance; correcting the phase of the voltage command based on the phase error; and controlling the power conversion circuitry 10 to control the driving power to follow the voltage command having the corrected phase.

The memory 192 temporarily stores the program loaded from the storage 193 and a calculation result by the processor 191. The processor 191 configures the above-described functional blocks by executing the program in cooperation with the memory 192. The switching control circuitry 194 generates the gate drive signal in response to a command from the processor 191, and outputs the gate drive signal to the inverter circuitry 13. An input/output port 195 inputs and outputs electrical signals to and from the current sensor 14, a display device 200, and the input device 300 in accordance with instructions from the processor 191.

The display device 200 and the input device 300 function as user interfaces of the power conversion device 1. The display device 200 includes, for example, a liquid crystal monitor, and is used to display information to the user. The input device 300 is, for example, a keypad or the like, and acquires input information by the user. The display device 200 and the input device 300 may be integrated like a so-called touch panel. The display device 200 and the input device 300 may be provided in an external device connected to the power conversion device 1 or may be incorporated in the power conversion device 1.

It should be noted that the control circuitry 100 may not be limited to one that configures each function by a program. For example, the control circuitry 100 may configure at least a part of functions by a dedicated logic circuit or an application specific integrated circuit (ASIC) in which the dedicated logic circuit is integrated.

Power Conversion Procedure Hereinafter, as an example of a power conversion method for generating the driving power of the electric motor 3 using the power conversion circuitry 10, a control procedure of the power conversion circuitry 10 using the control circuitry 100 will be described. The procedure includes: calculating the voltage command based on the frequency command, the output current from the power conversion circuitry 10 to the electric motor 3, and the estimated value of the inductance of the electric motor 3; calculating the phase error based on the voltage command, the output current from the power conversion circuitry 10 to the electric motor 3, and the estimated value of the inductance of the electric motor 3; correcting the phase of the voltage command based on the phase error; and controlling the power conversion circuitry 10 to control the driving power to follow the voltage command having the corrected phase.

Figure 5:
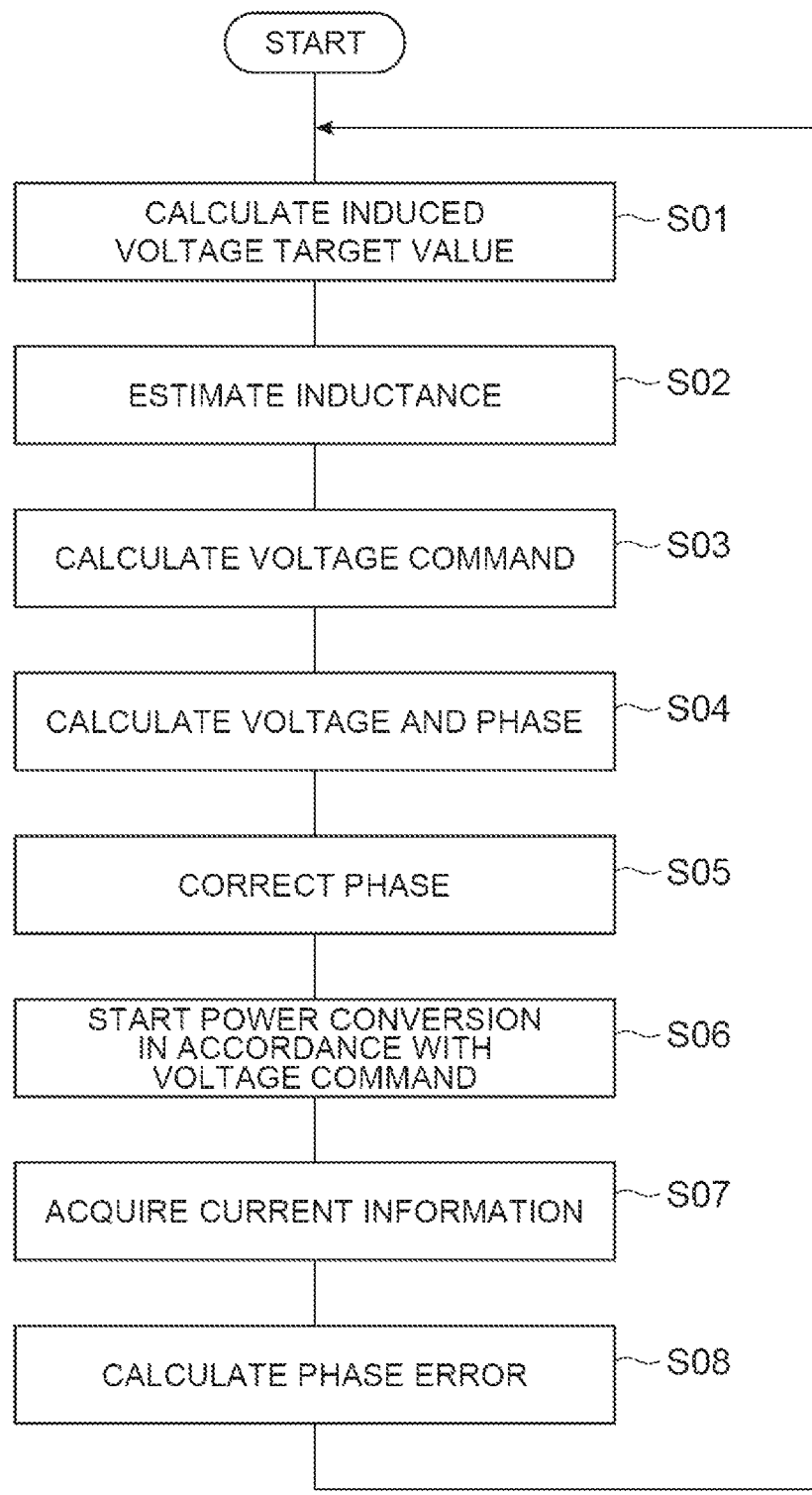
FIG. 5 is a flowchart illustrating an example power conversion procedure.

For example, the control circuitry 100 repeats operations S01 to S08 illustrated in FIG. 5 at a predetermined control cycle. In the operation S01, the induced voltage calculation unit 121 calculates the induced voltage target value corresponding to the frequency command in accordance with the predetermined command profile.

In the operation S02, the inductance estimation unit 132 derives the estimated value of inductance based on the value of output current acquired (calculated) by the current acquisition unit 114 in the previous control cycle (for example, the γ-axis current iγ or the δ-axis current iδ) and the inductance profile stored in the inductance storage unit 131.

In the operation S03, the voltage command calculation unit 122 adds or subtracts a voltage drop, a speed electromotive force, or the like to or from the induced voltage target value calculated in the operation S01 to generate the voltage command. For example, the voltage command calculation unit 122 calculates the γ-axis voltage command Vγ and the δ-axis voltage command Vδ based on the γ-axis current iγ and the δ-axis current iδ calculated by the current acquisition unit 114 in the previous control cycle, the winding resistance of the electric motor 3, the rotational speed of the electric motor 3 derived based on the frequency command, the estimated value of the inductance of the electric motor 3 derived by the operation S02, and the induced voltage target value.

In the operation S04, the voltage calculation unit 112 calculates the absolute value of the voltage command generated in the operation S03, and the phase calculation unit 113 calculates the phase of the voltage command in the fixed coordinate system. For example, the phase calculation unit 113 calculates the phase angle θf of the γδ-coordinate system with respect to the αβ-coordinate system based on the frequency command, calculates the phase angle θv of the voltage command vector V in the γδ-coordinate system based on the γ-axis voltage command Vγ and the δ-axis voltage command Vδ, sums the phase angle θf and the phase angle θv, and calculates the phase angle θ of the voltage command vector V with respect to the α-axis.

In the operation S05, the command correction unit 116 corrects the phase of the voltage command based on the phase error Δθ calculated by the error calculation unit 115 in the previous control cycle. For example, the command correction unit 116 corrects the phase of the voltage command by adding a correction amount based on the phase error to the phase calculated in the operation S03 (the phase before correction). In the operation S05, the gain calculation unit 142 may calculate the gain based on the frequency command and the gain profile, and the command correction unit 116 may correct the phase of the voltage command by a correction amount obtained by multiplying the gain calculated by the gain calculation unit 142 by the correction amount based on the phase error.

In the operation S06, the PWM control unit 117 starts to control the power conversion circuitry 10 so that the driving power follows the voltage command having phase corrected in the operation S05 (the voltage command after correction).

In the operation S07, the current acquisition unit 114 acquires the current information output from the power conversion circuitry 10 to the electric motor 3 in accordance with the voltage command after correction from the current sensor 14, and performs three-phase to two-phase conversion and rotational coordinate conversion on the acquired current information to calculate the γ-axis current iγ and the δ-axis current iδ. The current acquisition unit 114 may use the phase angle θf calculated in the operation S04 for the rotational coordinate conversion, or may use a phase angle obtained by adding the phase error Δθ to the phase angle θf calculated in the operation S04 for the rotational coordinate conversion.

In the operation S08, the error calculation unit 115 calculates the phase error of the voltage command based on the voltage command calculated in the operation S03 (the voltage command before correction), the output current calculated in the operation S07 (the γ-axis current iγ and the δ-axis current iδ), and the estimated value of the inductance derived in the operation S02. The output current acquired (calculated) in the operation S07 is also used in the operation S02 in the next control cycle. The estimation result of the phase error in the operation S08 is used in the operation S05 in the next control cycle.

This completes one cycle of the control procedure. In one cycle of the control procedure, the operation S02 (inductance estimation) may be performed before the operation S01 (induced voltage target value calculation). Further, the operation S02 may be executed after the operation S07 (current information acquisition). In this case, in the operation S03 (voltage command calculation), the voltage command calculation unit 122 generates the voltage command based on the estimated value of the inductance derived by the inductance estimation unit 132 in the previous control cycle.

The operation S08 (phase error calculation) may be executed earlier than the operation S05 (phase correction). In this case, in the operation S05, the error calculation unit 115 calculates the phase error based on the voltage command calculated in the previous control cycle and the output current calculated in the previous control cycle.

Figure 6:
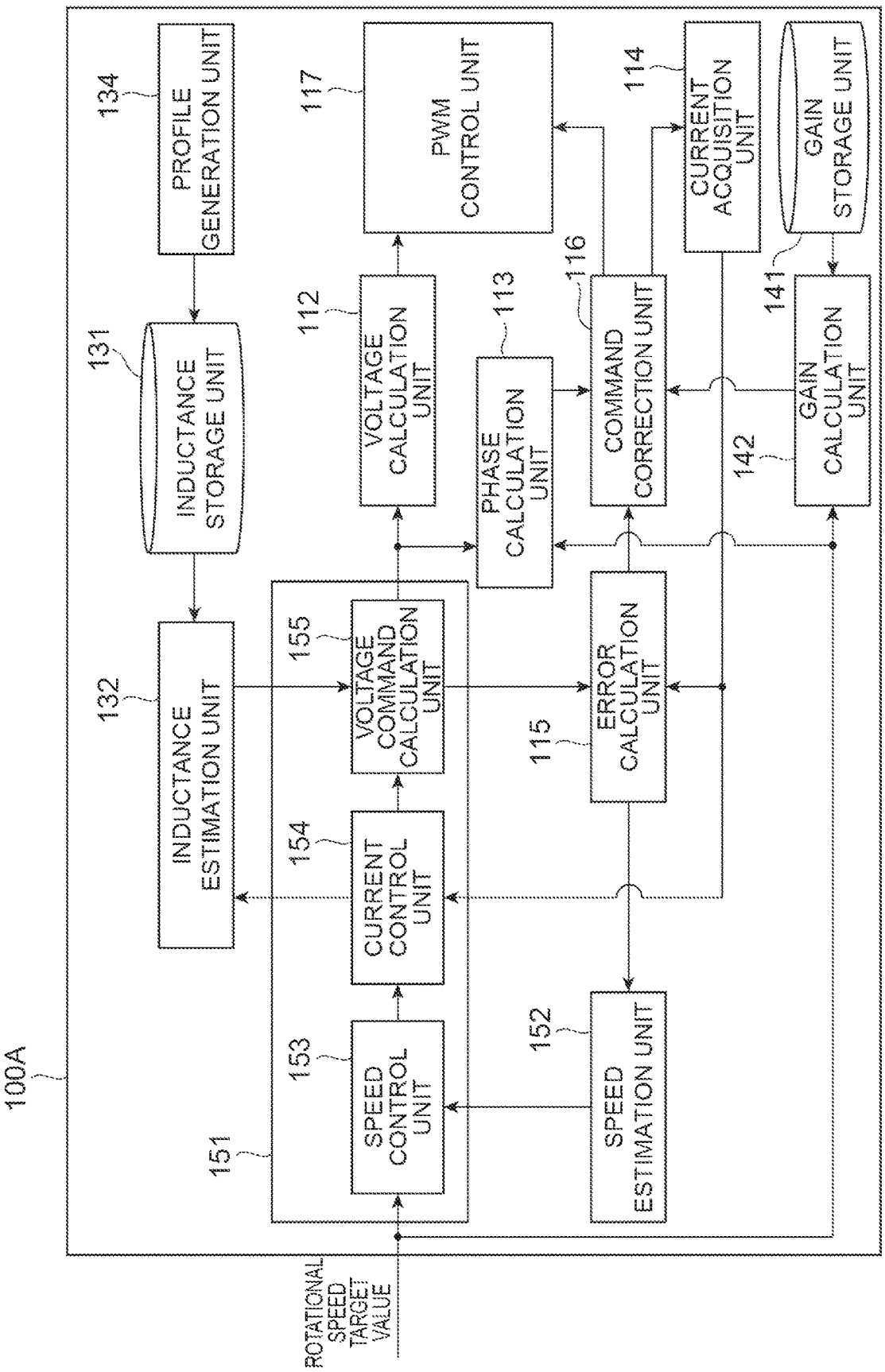
FIG. 6 is a block diagram illustrating a modification of the control circuitry.

Modification FIG. 6 is a block diagram illustrating a modification of the control circuitry. Control circuitry 100A illustrated in FIG. 6 is different from the control circuitry 100 in a configuration for calculating the voltage command based on the frequency command. The control circuitry 100A is obtained by replacing the command generation unit 111 in the control circuitry 100 with a command generator 151 and adding a speed estimation unit 152.

The command generator 151 is configured to calculate the voltage command based on the frequency command, the output current from the power conversion circuitry 10 to the electric motor 3, and the estimated value of the inductance of the electric motor 3. The command generator 151 includes a speed control unit 153, a current control unit 154, and a voltage command calculation unit 155.

The speed control unit 153 calculates a current command based on a deviation between a rotational speed target value of the electric motor 3 and the rotational speed of the electric motor 3 (hereinafter referred to as a "speed deviation"). For example, the speed control unit 153 calculates the current command by performing proportional operation, proportional-integral operation, or proportional-integral-derivative operation on the speed deviation. The rotational speed target value is, for example, a target value of the rotational speed of a rotating magnetic field generated by the alternating current in accordance with the frequency command. The current command is an output current target value from the power conversion circuitry 10 to the electric motor 3.

The current control unit 154 is configured to calculate a correction voltage based on a deviation between the output current target value and the output current value acquired by the current acquisition unit 114 (hereinafter referred to as a "current deviation"). For example, the speed control unit 153 calculates the correction voltage by performing proportional operation, proportional-integral operation, or proportional-integral-derivative operation on the current deviation.

A voltage command calculation unit 155 is configured to calculate the voltage command based on the correction voltage calculated by the current control unit 154. For example, based on the output current from the power conversion circuitry 10 to the electric motor 3, the rotational speed of the electric motor 3, and the estimated value of the inductance of the electric motor 3, the voltage command calculation unit 155 calculates a voltage vector obtained by performing a decoupling compensation on an induced voltage vector in which the γ-axis component is 0 and the δ-axis component is the product of the rotational speed of the electric motor 3 and a speed electromotive force constant, and calculates a voltage command vector by adding a correction voltage vector to the voltage vector.

The above-described calculation by the voltage command calculation unit 155 is expressed by, for example, the following expressions.

$$V\gamma = E\gamma - \omega \cdot L\delta \cdot i\delta \quad (6)$$

$$V\delta = E\delta + \omega(L\gamma \cdot i\gamma + \Phi) \quad (7)$$

In expressions (6) and (7), $\Phi$ is the velocity electromotive force coefficient, $E\gamma$ is the γ-axis component of the correction voltage, and $E\delta$ is the δ-axis component of the correction voltage.

The error calculation unit 115 calculates the phase error of the voltage command based on the voltage command vector, the correction voltage vector, the output current vector from the power conversion circuitry 10 to the electric motor 3, and the estimated value of the inductance. For example, the error calculation unit 115 calculates an induced voltage vector for calculating the phase error by the following expressions.

$$\varepsilon\gamma = V\gamma - E\gamma + \omega \cdot L\delta \cdot i\delta \quad (8)$$

$$\varepsilon\delta = V\delta - \omega \cdot L\gamma \cdot i\gamma - E\delta \quad (9)$$

The speed estimation unit 152 is configured to estimate the rotational speed of the electric motor 3 based on the phase error or the like calculated by the error calculation unit 115. The speed control unit 153 calculates the current command using a deviation between the rotational speed target value of the electric motor 3 and the rotational speed of the electric motor 3 estimated by the speed estimation unit 152 as the speed deviation.

Figure 7:
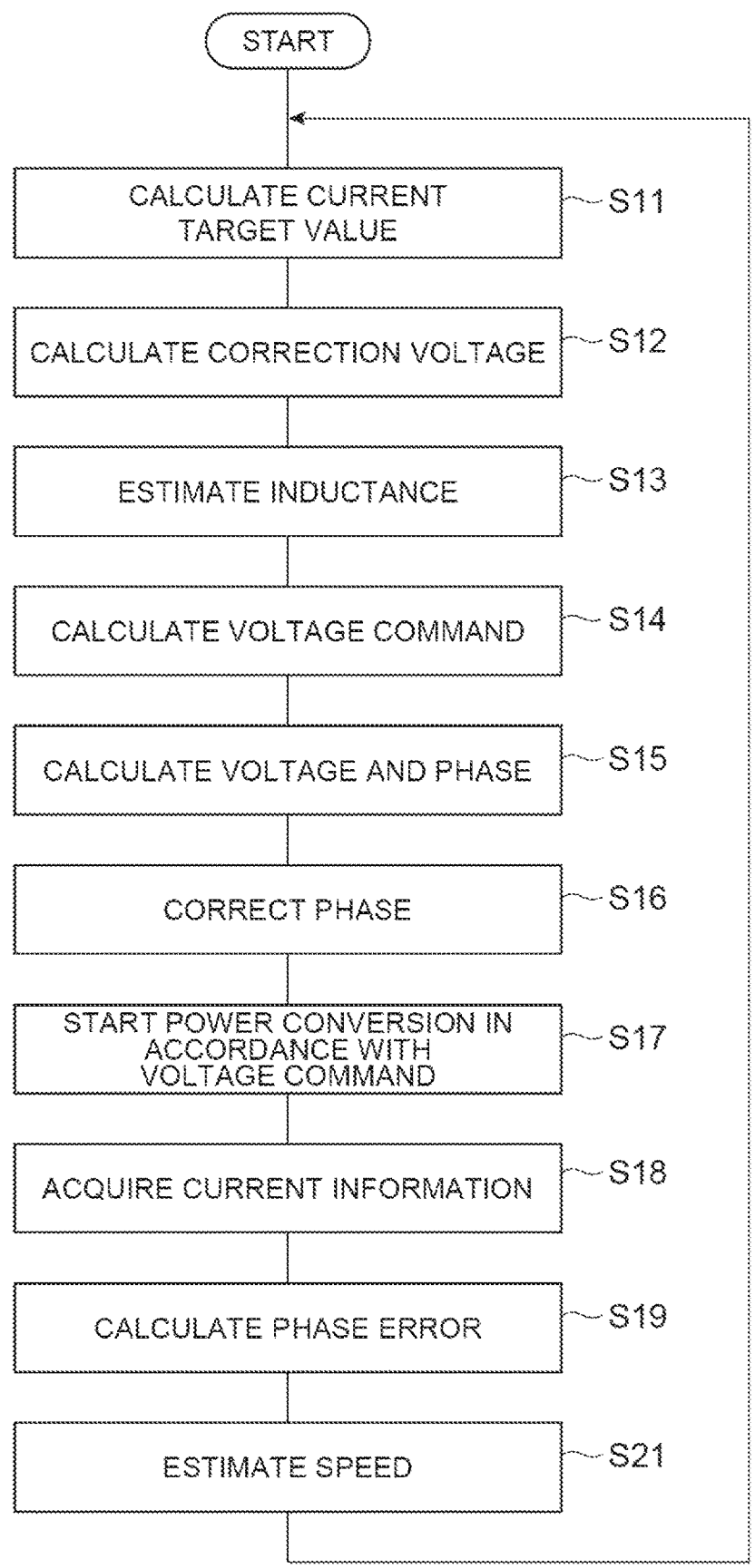
FIG. 7 is a flow chart illustrating a modification of a power conversion procedure.

FIG. 7 is a flowchart illustrating the control procedure of the power conversion circuitry 10 by the control circuitry 100A. The control circuitry 100A repeats operations S11 to S21 illustrated in FIG. 7 at a predetermined control cycle. In the operation S11, the speed control unit 153 calculates the current command based on a deviation between the rotational speed target value of the electric motor 3 and the rotational speed of the electric motor 3 estimated by the speed estimation unit 152 in the previous control cycle (the speed deviation).

In the operation S12, the current control unit 154 calculates the correction voltage based on the deviation between the output current target value and the output current calculated by the current acquisition unit 114 in the previous control cycle (the current deviation). In the operation S13, similarly to the operation S02, the inductance estimation unit 132 derives the estimated value of the inductance.

In the operation S14, the voltage command calculation unit 155 calculates the voltage command based on the correction voltage calculated in the operation S12. For example, the voltage command calculation unit 155 calculates the voltage command based on the output current calculated by the current acquisition unit 114 in the previous control cycle, the rotational speed of the electric motor 3, the correction voltage calculated by the operation S12, and the estimated value of the inductance of the electric motor 3 derived by the operation S13.

In the operation S15, similarly to the operation S04, the voltage calculation unit 112 calculates the absolute value of the voltage command, and the phase calculation unit 113 calculates the phase of the voltage command in the fixed coordinate system. In the operation S16, similarly to the operation S05, the command correction unit 116 corrects the phase of the voltage command based on the phase error Δθ calculated by the error calculation unit 115 in the previous control cycle. In the operation S17, similarly to the operation S06, the PWM control unit 117 starts to control the power conversion circuitry 10 so as to control the driving power to follow the voltage command after correction.

In the operation S18, similarly to the operation S07, the current acquisition unit 114 acquires, from the current sensor 14, the current information output from the power conversion circuitry 10 to the electric motor 3 in accordance with the voltage command after correction, and performs the three-phase to two-phase conversion and the rotational coordinate conversion on the acquired current information to calculate the γ-axis current iγ and the δ-axis current iδ.

In the operation S19, similarly to the operation S08, the error calculation unit 115 calculates the phase error of the voltage command based on the voltage command before correction calculated in the operation S14, the output current calculated in the operation S18, and the estimated value of the inductance derived in the operation S13. In the operation S21, the rotational speed of the electric motor 3 is estimated based on the phase error calculated in the operation S19.

The output current calculated in the operation S18 is also used in the operation S13 in the next control cycle. The estimation result of the phase error in the operation S19 is used in the operation S16 in the next control cycle. The estimation result of the rotational speed of the electric motor 3 in the operation S21 is used in the operation Si 1 in the next control cycle.

This completes one cycle of the control procedure. In the control procedure of one cycle, the operation S13 (inductance estimation) may be executed before the operation S11 (current target value calculation) and S12 (correction voltage calculation). Further, the operation S13 may be executed after the operation S18 (current information acquisition). In this case, in the operation S14 (voltage command calculation), based on the estimated value of the inductance derived by the inductance estimation unit 132 in the previous control cycle the voltage command calculation unit 155 calculates the voltage command based on the correction voltage.

The operation S19 (phase error calculation) may be executed before the operation S16 (phase correction). In this case, in the operation S19, the error calculation unit 115 calculates the phase error based on the voltage command calculated in the previous control cycle and the output current calculated in the previous control cycle. The operation S21 (speed estimation) may be executed before the operation S11 (current target value calculation). In this case, the operation S21 estimates the rotational speed of the electric motor 3 based on the phase error calculated in the previous control cycle.

As described in the above modification, the command generator of the control circuitry may be configured to calculate the voltage command based on the frequency command, the output current from the power conversion circuitry 10 to the electric motor 3, and the estimated value of the inductance of the electric motor 3, and the calculation method may be changed as appropriate.

Effects of Present Embodiment

As described above, the power conversion device 1 includes: the power conversion circuitry 10 that generates the driving power of the electric motor 3; the command generation unit 111 that calculates the voltage command based on the frequency command, the output current from the power conversion circuitry 10 to the electric motor 3, and the estimated value of the inductance of the electric motor 3; the error calculation unit 115 that calculates the phase error based on the voltage command, the output current from the power conversion circuitry 10 to the electric motor 3, and the estimated value of the inductance; the command correction unit 116 that corrects the phase of the voltage command based on the phase error; and the PWM control unit 117 that controls the power conversion circuitry 10 to control the driving power to follow the voltage command having the phase corrected by the command correction unit 116.

In order to control the phase of the voltage command to follow the movement of the electric motor 3, information on the inductance of the electric motor 3 may be used. In this case, when the error of the estimated value of the inductance increases due to the change in the inductance, the phase error of the voltage command increases, and desired power (for example, torque) may not be obtained. In contrast, with the power conversion device 1 the phase error is calculated based on the voltage command, the output current, and the estimated value of the inductance, and the phase of the voltage command is corrected based on the phase error. Accordingly, it is effective in improving the robustness of the control of the electric motor 3 with respect to the inductance change in the total load of the power supply including the electric motor 3.

The error calculation unit 115 may calculate the induced voltage vector based on the voltage command, the output current from the power conversion circuitry 10 to the electric motor 3, and the estimated value of the inductance, and calculate the phase error based on the phase of the induced voltage vector. In this case, the phase error can be calculated more appropriately.

The power conversion device 1 may further include: the inductance storage unit 131 that stores the inductance profile in which inductance changes in accordance with a value of output current; and the inductance estimation unit 132 that derives the estimated value of inductance based on the value of output current from the power conversion circuitry 10 to the electric motor 3 and the inductance profile, and the command generation unit 111 may calculate the voltage command based on the estimated value of inductance derived by the inductance estimation unit 132, and the error calculation unit 115 may calculate the phase error based on the estimated value of inductance derived by the inductance estimation unit 132. In this case, an inductance profile in which the inductance changes according to the value of the output current can be stored in advance, and the estimated value of the inductance can be derived based on the inductance profile. Accordingly, an error increase in the estimated value of the inductance due to a change in the value of the output current is prevented. Therefore, it is more effective in improving the robustness of the control of the electric motor 3 with respect to the inductance change in the total load of the power supply including the electric motor 3.

The power conversion device 1 may further include the profile generation unit 134 that generates the inductance profile based on the user input specifying at least two points of the inductance profile. In this case, by the user's setting the inductance profile suitable for the actual electric motor, expansion of the error of the estimated value of the inductance can be more reliably prevented.

The command correction unit 116 may correct the phase of the voltage command based on the integral value of the phase error. In this case, the phase of the electric motor 3 can be corrected more quickly.

The power conversion device 1 may further include: the gain storage unit 141 that stores a gain profile in which a gain during an operation of the electric motor 3 at a second speed higher than a first speed is smaller than a gain during the operation speed at the first speed; and the gain calculation unit 142 that calculates a gain based on the operation speed of the electric motor 3 and the gain profile, and the command correction unit 116 may correct the phase of the voltage command by a correction amount obtained by multiplying the correction amount based on the phase error by the gain calculated by the gain calculation unit 142. As the operating speed of the electric motor 3 increases, there is less room for increasing the absolute value of the voltage command vector (hereinafter referred to as "voltage amplitude"). Therefore, it is difficult to optimize the voltage amplitude in accordance with the correction of the phase of the voltage command. For this reason, the power of the electric motor 3 may be reduced by correcting the phase of the voltage command. In contrast, with the configuration in which the correction gain of the phase error is reduced when the operation speed of the electric motor 3 is high, a decrease in the power of the electric motor 3 due to the correction of the phase of the voltage command can be prevented.

The electric motor 3 may be a synchronous motor having saliency, and the command generation unit 111 may calculate a voltage command for generating the driving power corresponding to the synchronous motor having saliency. In a synchronous motor having saliency, a change in inductance corresponding to a change in the output current is larger than that in a synchronous motor having no saliency. For this reason, when the electric motor 3 is a synchronous motor having saliency, it is more beneficial to improve the robustness of the control of the electric motor 3 with respect to the inductance change.

System

Figure 8:
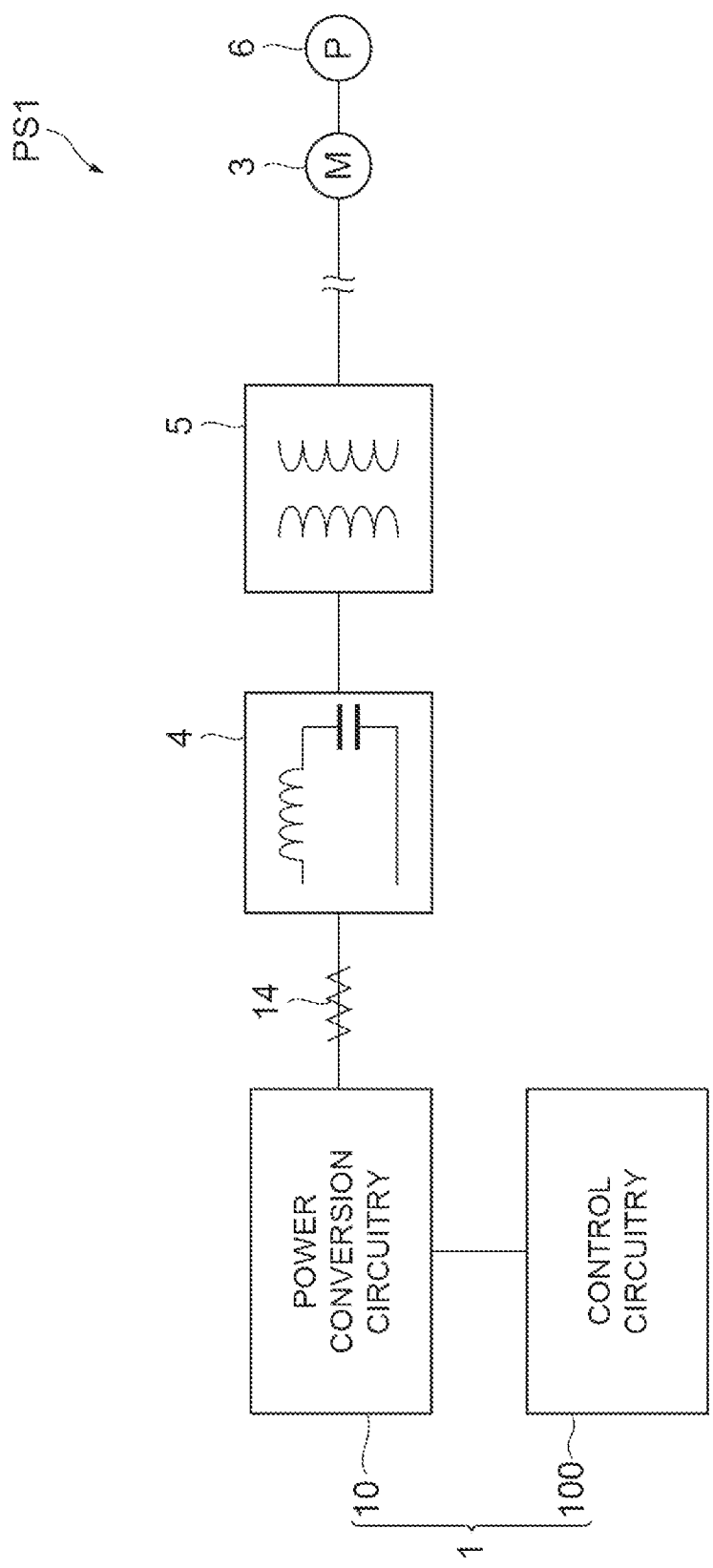
FIG. 8 is a schematic diagram illustrating an example system including the power conversion device.

Hereinafter, an example system including the power conversion device 1 will be described. FIG. 8 is a schematic diagram illustrating a system including the power conversion device 1. A system PS1 illustrated in FIG. 8 is a system for pumping out water in a hole excavated by resource search, civil engineering work, or the like, and includes the power conversion device 1, the electric motor 3, a filter 4, a step-up transformer 5, and an electric submersible pump 6.

The filter 4 is interposed between the power conversion circuitry 10 and the electric motor 3. Here, being interposed between the power conversion circuitry 10 and the electric motor 3 means being electrically interposed between the power conversion circuitry 10 and the electric motor 3. The filter 4 reduces a noise component included in the output of the power conversion circuitry 10. Here, the output of the power conversion circuitry 10 means the output power of the power conversion circuitry 10, and the output power includes an output voltage and an output current. For example, the filter 4 includes an input unit (a primary side) connected to the power conversion circuitry 10 and an output unit (a secondary side) connected to the step-up transformer 5, and outputs, from the output unit to the step-up transformer 5, power obtained by reducing noise components of power input from the power conversion circuitry 10 to the input unit. Examples of the filter 4 include an LC filter having a coil 41 and a capacitor 42. Since the filter 4 is electrically interposed between the power conversion circuitry 10 and the electric motor 3, the above-described current sensor 14 detects the output current from the power conversion circuitry 10 to the filter 4.

The step-up transformer 5 is interposed between the filter 4 and the electric motor 3. Being interposed between the filter 4 and the electric motor 3 means being electrically interposed between the filter 4 and the electric motor 3. The step-up transformer 5 boosts the output voltage of the filter 4 and supplies the boosted voltage to the electric motor 3. For example, the step-up transformer 5 has an input portion (the primary side) connected to the filter 4 and an output portion (the secondary side) connected to the electric motor 3, boosts a voltage that is input from the filter 4 to the input portion, and outputs the boosted voltage from the output portion to the electric motor 3. The step-up transformer 5 may be a Y-Y transformer in which both the primary side and the secondary side are star-connected, a $\Delta$-$\Delta$ transformer in which both the primary side and the secondary side are delta-connected, a Y-$\Delta$ transformer in which the primary side is star-connected and the secondary side is delta-connected, or a $\Delta$-Y transformer in which the primary side is delta-connected and the secondary side is star-connected.

The step-up transformer 5 compensates for a voltage drop in an electric path (for example, a cable or the like) from the step-up transformer 5 to the electric motor 3 by boosting the voltage of the filter 4. The electric path length from the step-up transformer 5 to the electric motor 3 is, for example, 1 to 10 kin. The electric submersible pump 6 is driven by the electric motor 3. The electric submersible pump 6 is arranged in a hole excavated by resource search, civil engineering work, or the like, and discharges water accumulated in the hole to the outside of the hole by driving force imparted from the electric motor 3.

In the system PS1, the inductance in the total load of the power conversion circuitry 10 greatly changes depending not only on the inductance of the electric motor 3 but also on conditions outside the electric motor 3, such as characteristics of the filter 4, characteristics of the step-up transformer 5, and characteristics of electric paths from the power conversion circuitry 10 to the electric motor 3 (for example, lengths and degrees of curvature). Therefore, the above-described improvement in robustness is more beneficial.

Figure 9:
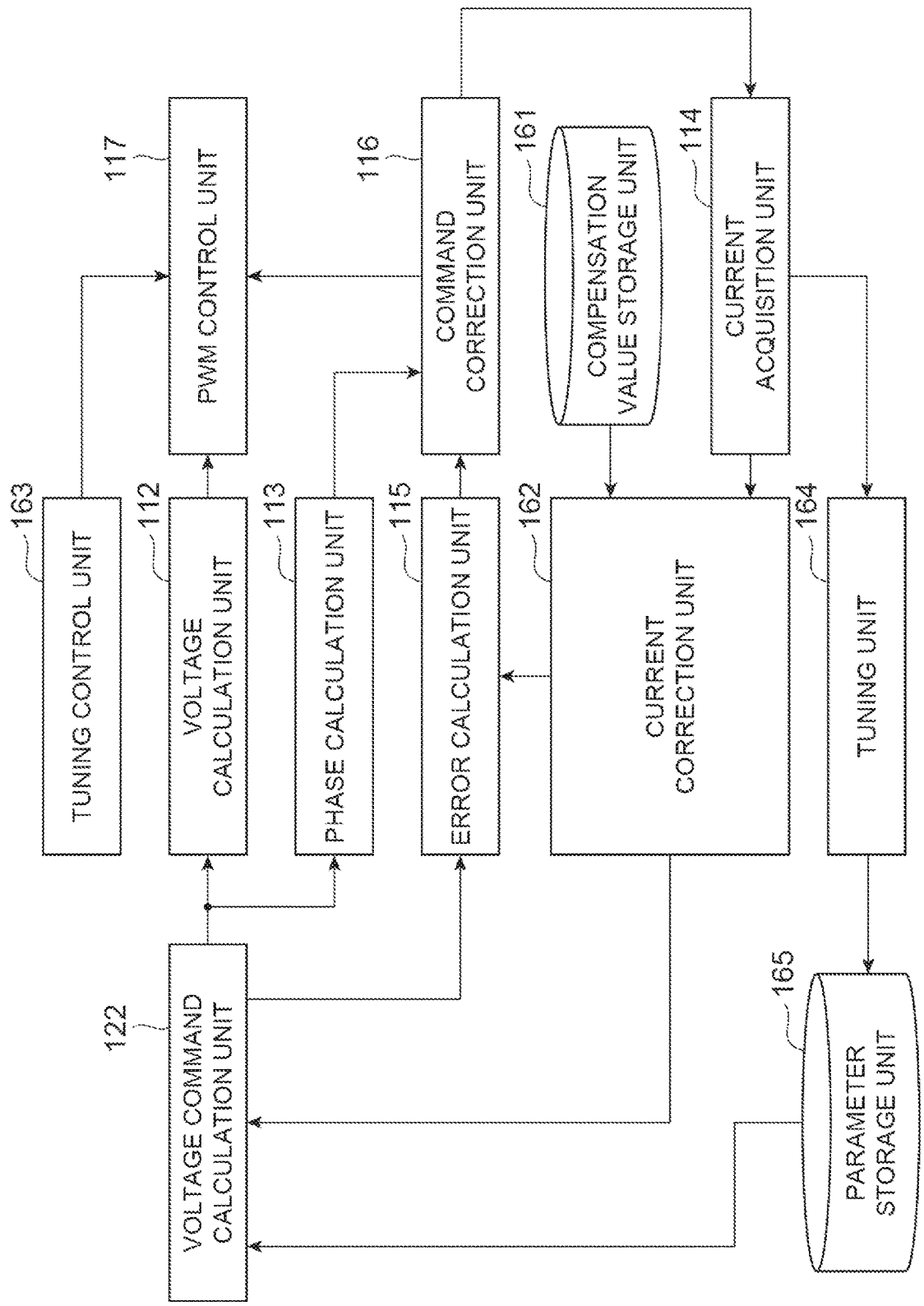
FIG. 9 is a schematic diagram illustrating a modification of the control circuitry.

Note that the phase of the output current generated by the power conversion circuitry 10 changes depending on the filter 4, the step-up transformer 5, and the like before reaching the electric motor 3. Correspondingly, the control circuitry 100 may further include a compensation value storage unit 161 and a current correction unit 162, as illustrated in FIG. 9.

The compensation value storage unit 161 is configured to store a phase compensation value that compensates for a phase change of the current in at least the step-up transformer 5 (a difference in phase between the current in the primary side and the current in the secondary side). The phase compensation value may include a first phase compensation value that compensates for a phase change of the voltage in the step-up transformer 5. In the step-up transformer 5, the difference in phase between the current obtained by subtracting the excitation current from the current of the primary side and the current of the secondary side is equal to the difference in phase between the voltage of the primary side and the voltage of the secondary side. Therefore, compensating for the phase change of the voltage in the step-up transformer 5 corresponds to compensating for at least a part of the phase change of the current in the step-up transformer 5. The compensation value storage unit 161 may further store the second phase compensation value that compensates for, at least, a phase change of the current in the filter 4. The first phase compensation value and the second phase compensation value are derived in advance by an actual machine test, simulation, or the like. For example, the first phase compensation value is determined in accordance with the phase differences of the voltage and current generated between the primary side and the secondary side of the step-up transformer 5, and the second phase compensation value is determined in accordance with the magnitude of the excitation current of the primary side of the step-up transformer 5, the fundamental wave component of the current to be supplied to the capacitor of the filter 4, and the like.

The current correction unit 162 is configured to correct the output current detected by the current sensor 14 based on the phase compensation value. The current correction unit 162 may correct the output current detected by the current sensor 14 based on the first phase compensation value and the second phase compensation value. For example, the current correction unit 162 adds or subtracts the first phase compensation value and the second phase compensation value to or from the phase of the output current so that the phase of the output current detected by the current sensor 14 approaches (for example, substantially matches) the phase of the current flowing through the secondary side of the step-up transformer 5 (for example, the output current from the step-up transformer 5 to the electric motor 3). For example, the current correction unit 162 corrects the output current vector calculated by the current acquisition unit 114 based on the first phase compensation value and the second phase compensation value. Further, the current correction unit 162 may be configured to correct the magnitude of the output current (for example, multiply the inverse ratio of the transformation ratio) based on the transformation ratio in the step-up transformer 5 (the ratio of the secondary side voltage with respect to the primary side voltage). The current correction unit 162 may correct the output current vector calculated by the rotational coordinate conversion by correcting the angle for the rotational coordinate conversion based on the first phase compensation value and the second phase compensation value before the current acquisition unit 114 performs the rotational coordinate conversion.

The voltage command calculation unit 122 may calculate the voltage command based on the frequency command, the output current from the power conversion circuitry 10 to the electric motor 3 (the output current detected by the current sensor 14), the estimated value of the inductance, and the phase compensation value. For example, the voltage command calculation unit 122 calculates the voltage command based on the frequency command, the output current corrected by the current correction unit 162 based on the phase compensation value, and the estimated value of the inductance. The calculation method of the voltage command by the voltage command calculation unit 122 is the same as the above-described method except that it is based on the output current corrected by the current correction unit 162 based on the phase compensation value.

The error calculation unit 115 may calculate the phase error based on the voltage command, the output current from the power conversion circuitry 10 to the electric motor 3 (the output current detected by the current sensor 14), the estimated value of the inductance, and the phase compensation value. For example, the error calculation unit 115 calculates the phase error based on the frequency command, the output current corrected by the current correction unit 162 based on the phase compensation value, and the estimated value of the inductance. The calculation method of the phase error by the error calculation unit 115 is the same as the above-described method except that it is based on the output current corrected by the current correction unit 162 based on the phase compensation value.

In this manner, the voltage command calculation unit 122 calculates the voltage command in consideration of the phase compensation value, and the error calculation unit 115 calculates the phase error in consideration of the phase compensation value. Thus, in the command correction unit 116, the voltage command is corrected so as to prevent an influence of the phase change of the output current by the filter 4 and the step-up transformer 5. The command correction unit 116 may be configured to correct the voltage command based on both the phase error calculated by the error calculation unit 115 and the phase compensation value. For example, in a case where the primary side and the secondary side of the step-up transformer 5 have different connection methods, a phase difference may occur in both the voltage and the current between the primary side and the secondary side of the step-up transformer 5. For example, when the step-up transformer 5 is a Δ-Y transformer, the phase of the secondary side voltage leads the phase of the primary side voltage by 30°, and the phase of the secondary side current leads the phase of the primary side current by 30°. In this case, if a phase change caused by other factors is ignored, the first phase compensation value is 30°. The current correction unit 162 adds 30° to the phase of the output current detected by the current sensor 14. The command correction unit 116 adds the phase error calculated by the error calculation unit 115 to the phase of the voltage command generated by the voltage command calculation unit 122, and subtracts 30° from the phase. Further, the command correction unit 116 may be configured to correct the magnitude of the voltage command based on the transformation ratio in the step-up transformer 5 (for example, multiply the inverse ratio of the transformation ratio).

The specifications of the step-up transformer 5, such as the phase shift between the primary voltage and the secondary voltage, the accurate transformation ratio including the tap variation, and the excitation current, may be unknown. In such a case, for example, by generating a voltage command with respect to the voltage of the primary side of the step-up transformer 5, it is possible to control the electric motor 3 connected to the secondary side of the step-up transformer 5. At this time, in the expressions (1) and (2) for determining the voltage command, the motor constants indicated in advance as the design value of the motor are used for a winding resistance R, the γ-axis inductance Lγ, and the δ-axis inductance Lδ of the electric motor 3, and a voltage lower than the rated voltage of the inverter is set for an induced voltage target value E. In this state, the voltage command is determined by expressions (1) and (2), and the second phase compensation value for compensating for a phase change caused by the filter 4 is set in the compensation value storage unit 161.

In the above state, since the induced voltage target value E, the winding resistance R, the γ-axis inductance Lγ, and the δ-axis inductance Lδ are not values converted to the primary winding side, step-out may occur depending on the load condition even if the motor is operated as it is. Therefore, the induced voltage target value E and the second phase compensation value are adjusted during a trial operation. By the adjustment, E, R·Iγ, −ω·Lδ·Iδ, ω·Lγ·iγ, and R·iδ in expressions (1) and (2) come close to more correct values, and thus it is possible to determine the voltage command in the primary side of the step-up transformer 5 which does not cause pull-out within the operation state range of the electric motor 3.

Figure 10:
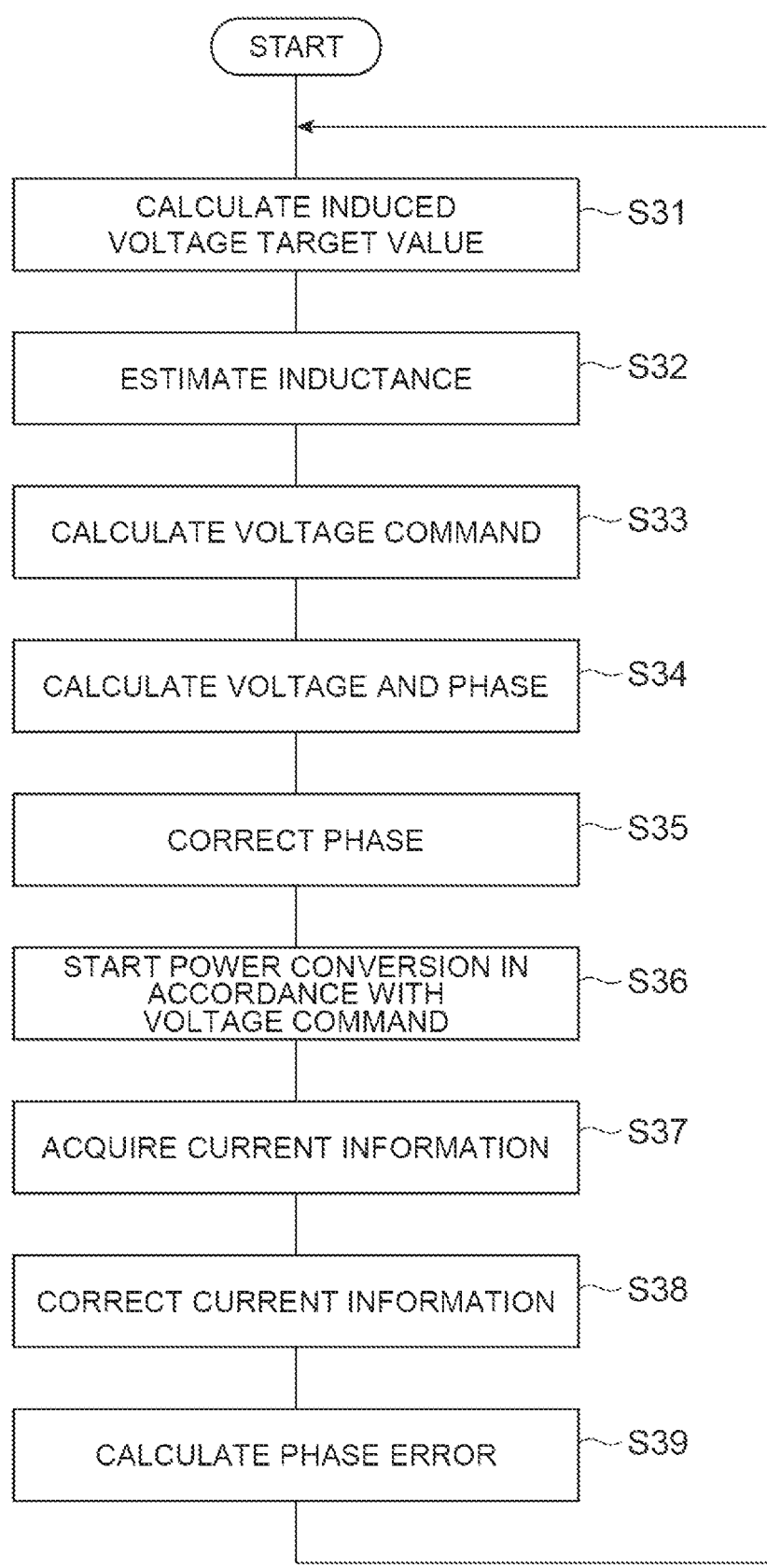
FIG. 10 is a flowchart illustrating a modification of the power conversion procedure.

FIG. 10 is a flowchart illustrating an example power conversion procedure when the control circuitry 100 further includes the compensation value storage unit 161 and the current correction unit 162. As illustrated in FIG. 10, the control circuitry 100 executes operations S31, S32, S33, S34, S35, S36, S37, S38, and S39. In the operation S31, similarly to the operation S01, the induced voltage calculation unit 121 calculates the induced voltage target value corresponding to the frequency command in accordance with a predetermined command profile. In the operation S32, similarly to the operation S02, the inductance estimation unit 132 derives an estimated value of inductance based on the value of output current acquired by the current acquisition unit 114 in the previous control cycle and the inductance profile stored in the inductance storage unit 131.

In the operation S33, the voltage command calculation unit 122 calculates the γ-axis voltage command Vγ and the δ-axis voltage command Vδ based on the output current corrected by the current correction unit 162 in the previous control cycle, the winding resistance of the electric motor 3, the rotational speed of the electric motor 3 derived based on the frequency command, the estimated value of the inductance of the electric motor 3, and the induced voltage target value. In the operation S34, similarly to the operation S04, the voltage calculation unit 112 calculates the absolute value of the voltage command, and the phase calculation unit 113 calculates the phase of the voltage command in the fixed coordinate system. In the operation S35, similarly to the operation S05, the command correction unit 116 corrects the phase of the voltage command based on the phase error calculated by the error calculation unit 115 in the previous control cycle. The command correction unit 116 may correct the phase of the voltage command based on the phase error calculated by the error calculation unit 115 and the phase compensation value. Also, the command correction unit 116 may further correct the magnitude of the voltage command based on an inverse ratio of the transformation ratio in the operation-up transformer 5.

In the operation S36, similarly to the operation S06, the PWM control unit 117 starts to control the power conversion circuitry 10 so as to control the driving power to follow the voltage command having the phase and the magnitude corrected in the operation S34 (the voltage command after correction). In the operation S37, the current acquisition unit 114 acquires, from the current sensor 14, the current information output from the power conversion circuitry 10 to the filter 4 in accordance with the voltage command after correction, and performs three-phase to two-phase conversion and rotational coordinate conversion on the acquired current information to calculate the γ-axis current iγ and the δ-axis current iδ. In the operation S38, the current correction unit 162 corrects the output current calculated in the operation S36 based on the phase compensation value, for example, by rotation conversion. In the operation S39, the error calculation unit 115 calculates the phase error based on the frequency command, the output current corrected by the current correction unit 162 based on the phase compensation value, and the estimated value of the inductance. This completes one cycle of the control procedure. The control circuitry 100 repeats the above procedure at a predetermined control cycle. In the above description, the procedure in which the current acquisition unit 114 calculates the output current vector and then the current correction unit 162 corrects the phase of the output current vector has been exemplified, but the procedure is not limited thereto. For example, the current correction unit 162 may correct the output current vector calculated by the rotational coordinate conversion by correcting the angle for the rotational coordinate conversion before the current acquisition unit 114 performs the rotational coordinate conversion.

Returning to FIG. 9, the power conversion device 1 may further include a tuning control unit 163, a tuning unit 164, and a parameter storage unit 165 instead of the inductance estimation unit 132. The tuning control unit 163 is configured to apply a tuning voltage from the power conversion circuitry 10 to the electric motor 3 in a state in which the power conversion circuitry 10 is connected to the electric motor 3 without intervening the filter 4 and the step-up transformer 5. The tuning unit 164 is configured to derive at least one control parameter including at least an estimated value of the inductance based on the tuning voltage and a tuning current flowing between the power conversion circuitry 10 and the electric motor 3 in response to the application of the tuning voltage. The parameter storage unit 165 stores the control parameter derived by the tuning unit 164.

The estimated value of the inductance derived by the tuning unit 164 includes the inductance of the electric path from the power conversion circuitry 10 to the electric motor 3 and the inductance of the electric motor 3 itself. The at least one control parameter may further include an estimated value of a resistance of the electric motor 3 in addition to the estimated value of the inductance. The estimated value of the resistance of the electric motor 3 includes the resistance of the electric path from the power conversion circuitry 10 to the electric motor 3 and the resistance of the winding itself of the electric motor 3.

When the power conversion device 1 further includes the tuning control unit 163 and the tuning unit 164, the voltage command calculation unit 122 may calculate the voltage command based on the frequency command, the output current corrected by the current correction unit 162, and at least one control parameter. The error calculation unit 115 may calculate the phase error based on the voltage command, the output current corrected by the current correction unit 162, and at least one control parameter. With this configuration, since generation of the voltage command and the calculation of the phase error are performed based on the control parameter tuned in accordance with the characteristics of the system PS1 excluding the filter 4 and the step-up transformer 5, the voltage command may further be corrected.

Figure 11:
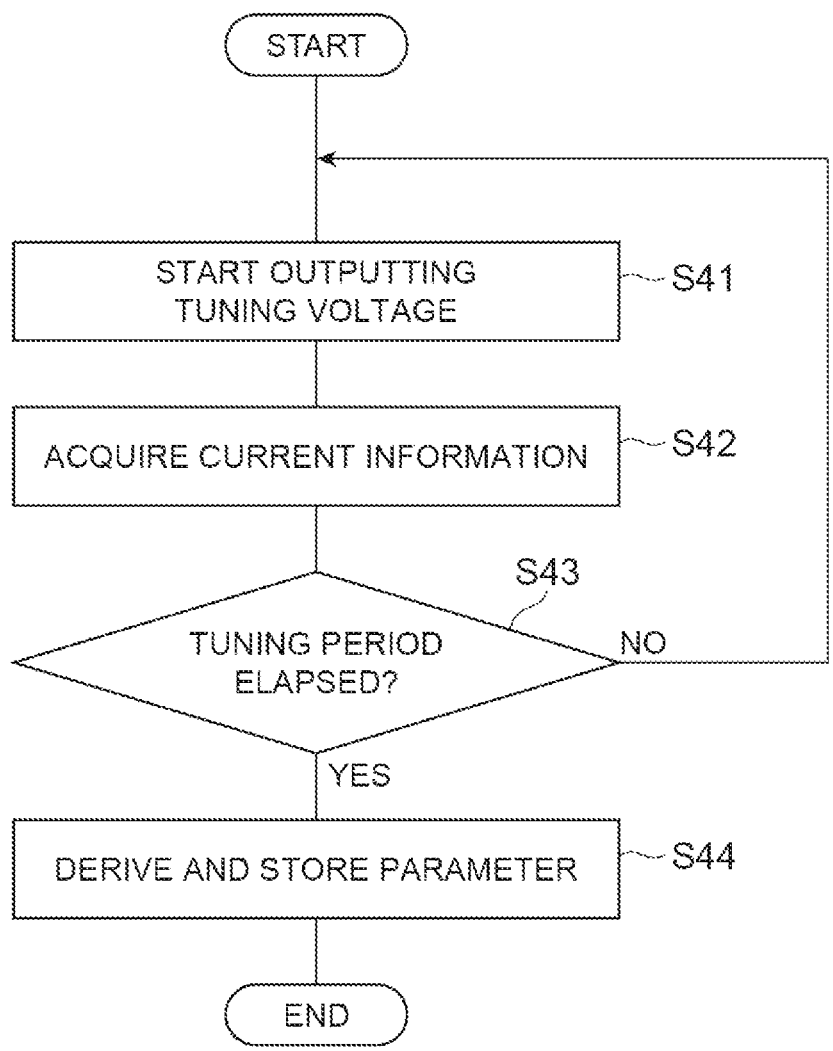
FIG. 11 is a flowchart illustrating an example procedure for deriving a control parameter.

FIG. 11 is a flowchart illustrating an example procedure for deriving a control parameter. This procedure is executed in a state in which the power conversion circuitry 10 is connected to the electric motor 3 without intervening the filter 4 and the step-up transformer 5 prior to the power conversion procedure illustrated in FIG. 10. When this procedure is executed, the process of calculating the estimated value of the inductance of the operation S32 may be omitted in the power conversion procedure. As illustrated in FIG. 11, the control circuitry 100 first executes operations S41, S42, and S43. In the operation S41, the tuning control unit 163 controls the power conversion circuitry 10 to start applying the tuning voltage. In the operation S42, the current acquisition unit 114 acquires information on the tuning current flowing between the power conversion circuitry 10 and the electric motor 3 in response to the application of the tuning voltage. In the operation S43, the tuning control unit 163 checks whether or not a predetermined tuning period has elapsed.

When it is determined that the tuning period has not elapsed in the operation S43, the control circuitry 100 returns the processing to the operation S41. When it is determined that the tuning period has elapsed in the operation S43, the control circuitry 100 executes a operation S44. In the operation S44, the tuning unit 164 derives at least one control parameter based on the tuning voltage and the tuning current flowing between the power conversion circuitry 10 and the electric motor 3 in response to the application of the tuning voltage, and stores the derived control parameter in the parameter storage unit 165. This completes the procedure for deriving the control parameters.

The configuration including the filter 4 and the step-up transformer 5, such as the system PS1, can also be applied to a system in which the driving target of the electric motor 3 is different from the electric submersible pump, and is useful for a system in which a voltage drop in an electric path between the power conversion circuitry 10 and the electric motor 3 cannot be ignored, for example.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A power conversion device comprising:
    a power conversion circuitry configured to generate a driving voltage for an electric motor; and
    control circuitry configured to:
        control the power conversion circuitry to generate the driving voltage corresponding to a voltage command;
        acquire information indicating an output current that has flown to the electric motor according to the driving voltage;
        calculate a phase error based on the voltage command, the output current, and an inductance of the electric motor;
        calculate an updated voltage command based on a frequency command, the output current, and the inductance, wherein the updated voltage command has a command phase;
        correct the command phase based on the phase error; and
        control the power conversion circuitry to generate the driving voltage corresponding to the updated voltage command having the corrected command phase.

2. The power conversion device according to claim 1, wherein the control circuitry is configured to:
    calculate an induced voltage vector based on the voltage command, the output current, and the inductance, wherein the induced voltage vector is generated in response to an operation of the electric motor; and
    calculate the phase error based on a phase of the induced voltage vector.

3. The power conversion device according to claim 2, wherein the control circuitry is configured to calculate the phase error based on a relation between the command phase and a phase of the induced voltage vector.

4. The power conversion device according to claim 3, wherein the command phase includes a rotation phase of a rotating coordinate system that rotates in accordance with the operation of the electric motor, and a relative command phase of the voltage command that is relative to the rotating coordinate system, and
    wherein control circuitry is configured to calculate the phase error based on a relative phase of the induced voltage vector that is relative to the rotating coordinate system.

5. The power conversion device according to claim 1, wherein the control circuitry is configured to:
    estimate the inductance of the electric motor;
    calculate the phase error based on the estimated inductance; and
    calculate the updated voltage command based on the estimated inductance.

6. The power conversion device according to claim 5, wherein the control circuitry is further configured to estimate the inductance based on the output current and a stored inductance profile that represents a relation between the inductance and the output current so that the inductance varies in accordance with a variation of the output current.

7. The power conversion device according to claim 6, wherein the control circuitry is configured to generate the inductance profile based on a user input including at least two different data sets each of which includes a combination of a value of the inductance and a value of the output current.

8. The power conversion device according to claim 1, wherein the control circuitry is configured to correct the command phase based on an integral value of the phase error.

9. The power conversion device according to claim 1, wherein the control circuitry is configured to:
    calculate a gain based on an operation speed of the electric motor and a stored gain profile that represents an inverse relationship between the gain and the operation speed in which the gain decreases as the operation speed increases; and
    correct the command phase based on the phase error and the calculated gain.

10. The power conversion device according to claim 1, wherein the control circuitry is configured to calculate the updated voltage command to compensate an induced voltage generated in response to the output current.

11. The power conversion device according to claim 10, wherein the electric motor is a synchronous motor having saliency, and
    wherein the control circuitry is configured to calculate the updated voltage command based on the frequency command, the output current, the inductance, and the saliency.

12. The power conversion device according to claim 1 wherein the control circuitry is configured to:
    calculate the phase error based on the voltage command, the output current, the inductance, and a stored phase compensation value for compensating a phase difference between the output current and an input current to the electric motor; and
    calculate the updated voltage command based on the frequency command, the output current, the inductance, and the phase compensation value.

13. The power conversion device according to claim 12, further comprising a current sensor configured to detect the output current,
    wherein the control circuitry is further configured to:
        correct the detected output current based on the phase compensation value;
        calculate the phase error based on the voltage command, the corrected output current, and the inductance; and
        calculate the updated voltage command based on the frequency command, the corrected output current, and the inductance.

14. The power conversion device according to claim 13, wherein the control circuitry is configured to correct the command phase based on the phase error and the phase compensation value.

15. The power conversion device according to claim 14, wherein the phase compensation value includes a first phase compensation value for compensating at least a first phase difference between a first input current to a transformer and a first output current from the transformer toward the electric motor.

16. The power conversion device according to claim 14, wherein the phase compensation value further includes a second phase compensation value for compensating at least a second phase difference between a second input current to a filter and a second output current from the filter toward the electric motor.

17. A system comprising:
the power conversion device according to claim 1;
the electric motor;
a filter connected between the power conversion circuitry and the electric motor to reduce a noise included in the driving voltage; and
a step-up transformer connected between the power conversion circuitry and the electric motor to boost the driving voltage.

18. The system according to claim 17, further comprising an electric submersible pump driven by the electric motor.

19. A power conversion method comprising:
controlling a power conversion circuitry to generate a driving voltage corresponding to a voltage command;
acquiring current information indicating an output current that has flown, according to a driving voltage, from a power conversion circuitry to an electric motor;
calculating a phase error based on the voltage command, the output current, and an inductance of the electric motor;
calculating an updated voltage command based on a frequency command, the output current, and the inductance, wherein the updated voltage command has a command phase;
correcting the command phase based on the phase error; and
controlling the power conversion circuitry to generate the driving voltage corresponding to the updated voltage command having the corrected command phase to drive the electric motor.

20. A non-transitory memory device having instructions stored thereon that, in response to execution by a processing device, cause the processing device to perform operations comprising:
controlling a power conversion circuitry to generate a driving voltage corresponding to a voltage command;
acquiring current information indicating an output current that has flown, according to a driving voltage, from a power conversion circuitry to an electric motor;
calculating a phase error based on the voltage command, the output current, and an inductance of the electric motor;
calculating an updated voltage command based on a frequency command, the output current, and the inductance, wherein the updated voltage command has a command phase;
correcting the command phase based on the phase error; and
controlling the power conversion circuitry to generate the driving voltage corresponding to the updated voltage command having the corrected command phase to drive the electric motor.

* * * * *